(12) United States Patent  
Shimoda et al.

(10) Patent No.: US 7,799,242 B2  
(45) Date of Patent: Sep. 21, 2010

(54) LIQUID CRYSTALLINE COMPOSITION, OPTICALLY ANISOTROPIC FILM, OPTICAL FILM, AND POLARIZER AND LIQUID-CRYSTAL DISPLAY DEVICE USING THEM

(75) Inventors: Kazuhiro Shimoda, Odawara (JP); Hirokazu Nishimura, Odawara (JP); Shuji Kanayama, Minami-ashigara (JP); Yasutomo Goto, Fujinomiya (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 67 days.

(21) Appl. No.: 12/034,695

(22) Filed: Feb. 21, 2008

(65) Prior Publication Data  
US 2008/0203357 A1 Aug. 28, 2008

(30) Foreign Application Priority Data  
Feb. 22, 2007 (JP) ............... 2007-041746  
Aug. 9, 2007 (JP) ............... 2007-207470  
Aug. 9, 2007 (JP) ............... 2007-207471

(51) Int. Cl.  
C09K 19/00 (2006.01)  
C09K 19/06 (2006.01)  
C09K 19/52 (2006.01)

(52) U.S. Cl. ............... 252/299.01; 252/299.6; 430/20; 428/1.1; 349/182

(58) Field of Classification Search ............ 252/299.01, 252/299.6; 430/20; 428/1.1; 349/182  
See application file for complete search history.

(56) References Cited  
U.S. PATENT DOCUMENTS  
2008/0192191 A1* 8/2008 Nakamura et al. .......... 349/117

FOREIGN PATENT DOCUMENTS  
JP 2001-330725 A 11/2001  
JP 2002-020363 A 1/2002  
JP 2004-198511 A 7/2004  
JP 2005-164628 A 6/2005

* cited by examiner

*Primary Examiner*—Geraldina Visconti  
(74) *Attorney, Agent, or Firm*—Buchanan Ingersoll & Rooney PC

(57) ABSTRACT

A liquid crystalline composition is disclosed. The composition comprises at least one liquid-crystal compound and at least one fluoroaliphatic group-containing polymer of a formula (1-1). In the formula, i and j each indicate an integer equal to or more than 1; M represents k types of repetitive units each derived from an ethylenic unsaturated monomer (k indicates an integer equal to or more than 1); a, b and c each mean a mass percentage indicating a polymerization ratio; $R^{11}$ and $R^{12}$ each represent a hydrogen atom or a methyl group; $X^1$ and $X^2$ each represent an oxygen atom, a sulfur atom or $-N(R^{13})-$; $R^{13}$ represents a hydrogen atom or an alkyl group having from 1 to 4 carbon atoms; m1 and m2 each indicate an integer of from 1 to 6; and n1 indicates an integer of from 0 to 3.

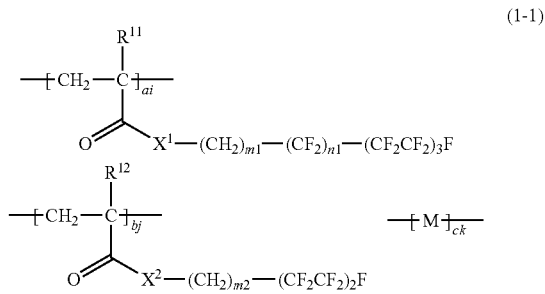

22 Claims, 1 Drawing Sheet

LIQUID CRYSTALLINE COMPOSITION, OPTICALLY ANISOTROPIC FILM, OPTICAL FILM, AND POLARIZER AND LIQUID-CRYSTAL DISPLAY DEVICE USING THEM

CROSS-REFERENCE TO RELATED APPLICATIONS

This application claims benefit of priority under 35 U.S.C. 119 to Japanese Patent Application Nos. 2007-041746 filed Feb. 22, 2007, 2007-207471 filed Aug. 9, 2007, and 2007-207470 filed Aug. 9, 2007, and the entire contents of the applications are incorporated herein by reference.

BACKGROUND OF THE INVENTION

1. Field of the Invention

The present invention relates to a liquid crystalline composition comprising a liquid-crystal compound, an optically anisotropic film formed of the liquid crystalline composition, an optical film comprising an optically anisotropic layer formed of the liquid crystalline composition, and a polarizer and a liquid-crystal display device comprising the optical film.

2. Related Art

Recently proposed is use of an optical compensatory sheet comprising a transparent support and an optically anisotropic layer of a discotic liquid crystalline composition thereon, in place of a stretched birefringent film. In general, the optically anisotropic layer is formed by applying a liquid crystalline composition containing a liquid-crystal compound such as a discotic liquid-crystal compound, to an alignment film, then heating it at a temperature higher than the alignment temperature to thereby align molecules of the liquid-crystal compound, and fixing the alignment state. In producing the optical compensatory sheet of the type, the liquid-crystal molecules therein must be controlled in a desired alignment state. One example known for controlling the alignment of liquid-crystal molecules is using an alignment layer (interface treatment). However, only by the control force of the alignment layer, it is difficult to align liquid-crystal molecules uniformly from the alignment-layer interface to the air-interface (for monodomain alignment), and some defects such as shlieren may often remain. In particular, when the ripening time in producing the sheet is shortened for improving the producibility, shlieren defects may be more remarkable. In case where the optically anisotropic layer has such shlieren defects, it is problematic in that the defects causes light scattering and therefore detracts from the optical properties of the film.

Also proposed is a method of controlling the alignment of liquid-crystal molecules by adding an additive to the optically anisotropic layer containing liquid-crystal molecules, along with (or in place of) using such an alignment layer. For example, proposed is a method of adding a compound having a fluorine-substituted alkyl group and a hydrophilic group (a sulfo group bonding to a benzene ring via a linking group), to an optically anisotropic layer, thereby controlling the tilt angle of a discotic liquid-crystal compound (for example, see JPA No. 2001-330725). Also proposed is a method of adding a hydrophobic compound having an excluded volume effect to an optically anisotropic layer, thereby controlling the alignment of a liquid-crystal compound (for example, see JPA No. 2002-20363). Also proposed is a fluoroaliphatic group-containing copolymer as an additive capable of promoting the hybrid alignment of a liquid-crystal compound and contributing toward improving the coatability thereof (for example, see JPA Nos. 2004-198511, 2005-164628).

SUMMARY OF THE INVENTION

In case where an optically anisotropic layer is formed of a liquid crystalline composition, a coating liquid comprising the liquid-crystal composition is prepared, and then dried thereby making the molecules of the liquid-crystal compound have a predetermined alignment state. The present inventors have studied a drying process of a coating liquid after applied onto a surface, and have found that a coating film becomes uneven during initial drying immediately after applying a coating liquid to a surface, that even though the fluoroaliphatic group-containing copolymer described in the above-mentioned JPA Nos. 2004-198511 and 2005-164628 is used, the unevenness could not be sufficiently reduced, and that, for satisfying the requirements for brightness enhancement and display panel enlargement, the unevenness reduction in initial drying is necessary.

Addition of surfactant to a coating liquid contributes to improvement of coating properties and reduction of unevenness in drying, however, it is a factor in blocking, which is a negative effect. Blocking is a phenomenon of bonding stacked films under an excessive pressure before a coating liquid is dried completely, or, even after coating liquid is dried and cured completely, in the presence of an additive localized at the film surface. For example, a produced long film is preserved and transported in a rolled-up state. In such a case, films are stacked with their surfaces contiguous under a pressure for a long time. Under a pressure, blocking may occur in stacked films and it results in not only opaqueness of films but also bonding them. If, as well as reduction of unevenness in drying being achieved, inhibition of blocking can be achieved, the total productivity can be improved remarkably.

An object of the first invention is to provide an optical film such as an optical compensatory film which, even when applied to large-panel liquid-crystal display devices, gives no or little display unevenness and therefore contributes toward high-quality image display performance, and to provide a liquid crystalline composition useful for producing optical films.

Another object of the first invention is to provide a polarizer that has no or little unevenness to be caused by the optical film therein and therefore contributes toward high-quality image display performance, and to provide a liquid-crystal display device capable of displaying high-quality images.

An object of the second invention is to provide an optical film such as an optical compensatory film which, even when applied to large-panel liquid-crystal display devices, gives no or little display unevenness and therefore contributes toward high-quality image display performance, and to provide a liquid crystalline composition useful for producing the optical film.

Another object of the second invention is to provide a liquid crystalline composition capable of forming optically anisotropic films in a high yield with few unevenness in drying and few blocking phenomenon.

Another object of the second invention is to provide a polarizer that has no or little unevenness to be caused by the optical film therein and therefore contributes toward high-quality image display performance, and to provide a liquid-crystal display device capable of displaying high-quality images.

The first invention relates to a liquid crystalline composition comprising at least one liquid-crystal compound and at least one fluoroaliphatic group-containing polymer of a formula (1-1):

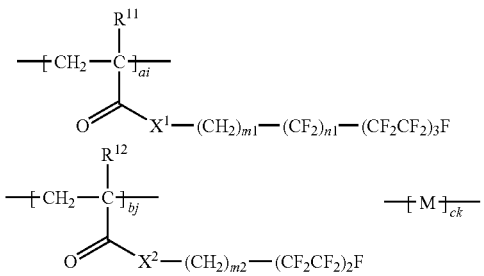

(1-1)

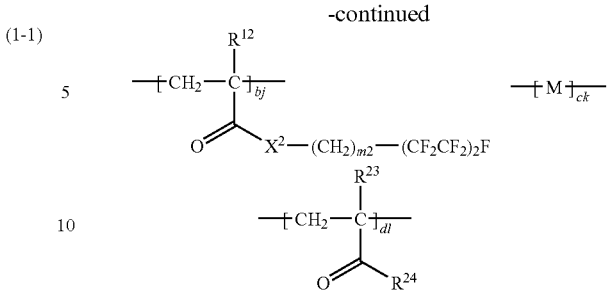

-continued wherein i and j each indicate an integer equal to or more than 1, meaning that the polymer has i and j types of the respective repetitive units; M represents k types of repetitive units each derived from an ethylenic unsaturated monomer (k indicates an integer equal to or more than 1); a, b and c each mean a mass percentage indicating a polymerization ratio; $\Sigma ai$ means a numerical value of from 1 to 98% by mass; $\Sigma bj$ means a numerical value of from 1 to 98% by mass; $\Sigma ck$ means a numerical value of from 1 to 98% by mass; $R^{11}$ and $R^{12}$ each represent a hydrogen atom or a methyl group; $X^1$ and $X^2$ each represent an oxygen atom, a sulfur atom or —N($R^{13}$)—; $R^{13}$ represents a hydrogen atom or an alkyl group having from 1 to 4 carbon atoms; m1 and m2 each indicate an integer of from 1 to 6; and n1 indicates an integer of from 0 to 3.

As embodiments of the first invention, there are provided the liquid crystalline composition wherein $\Sigma ai/(\Sigma ai+\Sigma bj)$ is from 0.2 to 0.8; the liquid crystalline composition wherein $\Sigma ai+\Sigma bj$ is from 20 to 50% by mass; the liquid crystalline composition wherein the viscosity at 25° C. of the fluoroaliphatic group-containing polymer is from 200 Pa·s to 10000 Pa·s; the liquid crystalline composition the content of the fluoroaliphatic group-containing polymer is from 0.02 to 0.50% by mass with respect to the total mass of the composition; the liquid crystalline composition wherein the ratio of the surface tension of the composition at 10 msec to that at 1000 msec (10 msec/1000 msec), as measured according to a maximum bubble pressure method, is from 1.00 to 1.20; and the liquid crystalline composition wherein the product of the concentration, C % by mass, of the fluoroaliphatic group-containing polymer and the fluorine content, F %, in the fluoroaliphatic group-containing polymer, C×F, is from 0.05 to 0.12.

The second invention relates to a liquid crystalline composition comprising at least one liquid-crystal compound and at least one fluoroaliphatic group-containing polymer wherein the glass transition point of the fluoroaliphatic group-containing polymer is from −25° C. to 50° C.

According to the second invention, the fluoroaliphatic group-containing polymer is preferably selected from a formula (1-2) shown below:

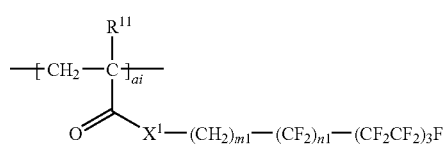

(1-2)

where i and j each indicate an integer equal to or more than 1, meaning that the polymer has i and j types of the respective repetitive units; M represents k types of repetitive units each derived from an ethylenic unsaturated monomer (k indicates an integer equal to or more than 1); a, b, c and d each mean a mass percentage indicating a polymerization ratio; $\Sigma ai$ means a numerical value of from 1 to 98% by mass; $\Sigma bj$ means a numerical value of from 1 to 98% by mass; $\Sigma ck$ means a numerical value of from 1 to 98% by mass, $\Sigma dl$ means a numerical value of from 0.1 to 20% by mass; $R^{11}$, $R^{12}$ and $R^{23}$ each represent a hydrogen atom or a methyl group; $R^{24}$ represents hydroxyl or methoxy; $X^1$ and $X^2$ each represent an oxygen atom, a sulfur atom or —N($R^{13}$)—; $R^{13}$ represents a hydrogen atom or an alkyl group having from 1 to 4 carbon atoms; m1 and m2 each indicate an integer of from 1 to 6; and n1 indicates an integer of from 0 to 3.

As embodiments of the second invention, there are provided the liquid crystalline composition wherein the content of the fluoroaliphatic group-containing polymer is from 0.02 to 0.50% by mass with respect to the total mass of the composition; the liquid crystalline composition wherein $R^{11}$, $R^{12}$ and $R^{23}$ each represent a methyl group; the liquid crystalline composition wherein $\Sigma ai/(\Sigma ai+\Sigma bj)$ is from 0.2 to 0.8; and the liquid crystalline composition wherein $\Sigma ai+\Sigma bj$ is from 20 to 50% by mass.

In another aspect, the present invention provides an optically anisotropic film formed of a liquid crystalline composition of the first or second invention; an optical film comprising an optically anisotropic layer formed of a liquid crystalline composition of the first or second invention; a polarizer comprising the optical film; and a liquid-crystal display device comprising the optical film.

In the optically anisotropic film of the invention, the fluorine atom existence ratio (ESCA:F/C) in a position from the air interface up to 10 nm may be from 2 to 10, relative to the fluorine atom existence ratio (ESCA:F/C) in the air interface of 100.

DETAILED DESCRIPTION OF THE INVENTION

Figure 1:
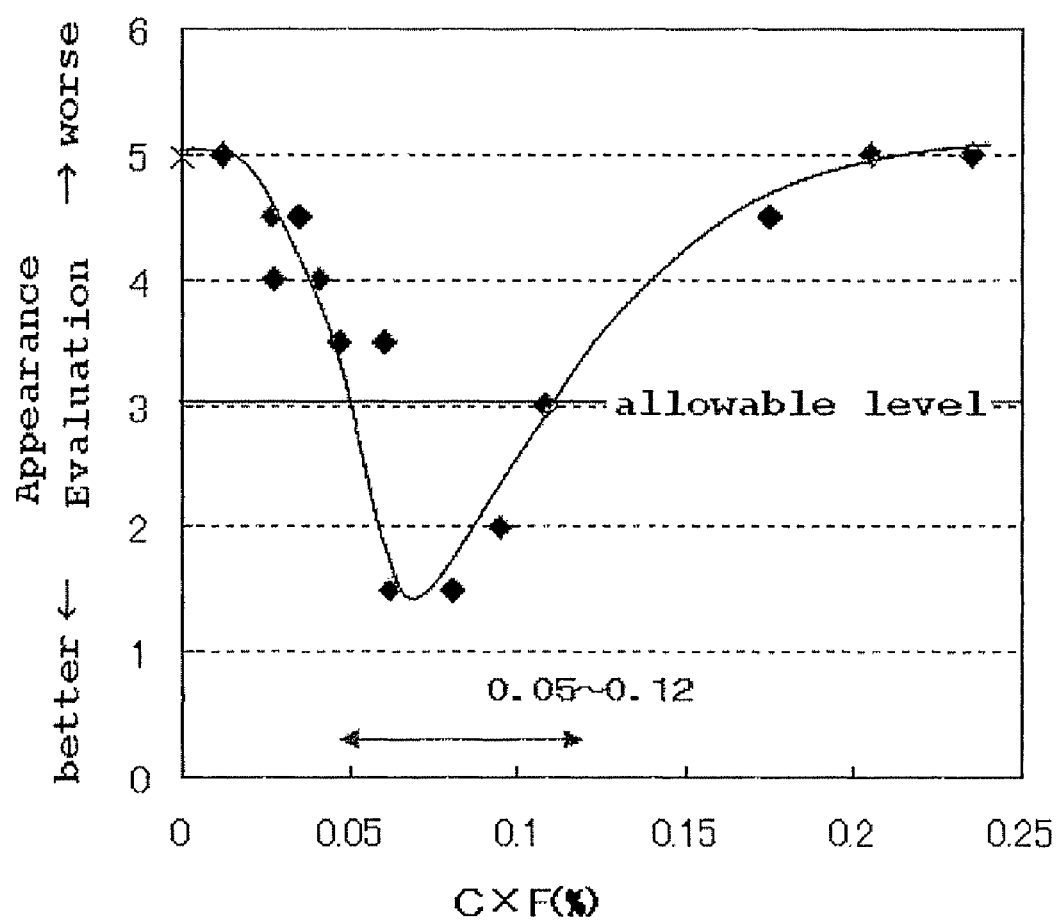
FIG. 1 is a graph showing the data of the optical films produced in Example 1-4, in which C×F of the coating liquid for each optical film is plotted on the horizontal axis and the score of the outward appearance evaluation of each optical film is on the vertical axis.

The invention is described in detail hereinunder. In this description, the numerical range expressed by the wording "a number to another number" means the range that falls between the former number indicating the lowermost limit of the range and the latter number indicating the uppermost limit thereof.

[Liquid Crystalline Composition of First Invention]

The liquid crystalline composition of the first invention comprises at least one liquid-crystal compound and at least one, predetermined fluoroaliphatic group-containing polymer. Fluoroaliphatic Group-Containing Polymer:

The fluoroaliphatic group-containing polymer to be used in the first invention is represented by the following formula (1-1):

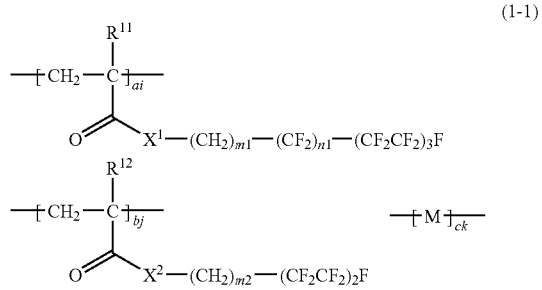
(1-1)

In the formula (1-1), i and j each indicate an integer equal to or more than 1, meaning that the polymer has i and j types of the respective repetitive units; M represents k types of repetitive units each derived from an ethylenic unsaturated monomer (k indicates an integer equal to or more than 1); a, b and c each mean a mass percentage indicating a polymerization ratio; Σai means a numerical value of from 1 to 98% by mass; Σbj means a numerical value of from 1 to 98% by mass; Σck means a numerical value of from 1 to 98% by mass; $R^{11}$ and $R^{12}$ each represent a hydrogen atom or a methyl group; $X^1$ and $X^2$ each represent an oxygen atom, a sulfur atom or —N($R^{13}$)—; $R^{13}$ represents a hydrogen atom or an alkyl group having from 1 to 4 carbon atoms; m1 and m2 each indicate an integer of from 1 to 6; n1 indicates an integer of from 0 to 3.

In the formula (1-1), the following repetitive units A and B are repetitive units derived from a —$(CF_2CF_2)_3$F-terminated fluoroaliphatic group-containing monomer A and a —$(CF_2CF_2)_2$F-terminated fluoroaliphatic group-containing monomer B, respectively.

Repetitive Unit A:

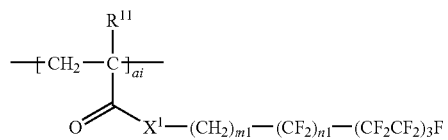

Repetitive Unit B:

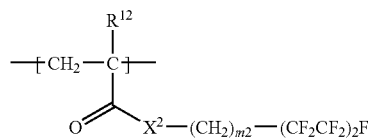

In the repetitive units A and B, $X^1$ and $X^2$ are preferably oxygen atoms. That is, the repetitive units A and B are preferably repetitive units derived from (meth)acrylate monomers.

In the units, m1 and m2 each are preferably from 1 to 4, more preferably from 1 to 2.

In the unit, n1 is preferably from 0 to 2, more preferably 0 or 1, most preferably 0.

Examples of the fluoroaliphatic group-containing monomer that gives the above repetitive unit A are shown below, to which, however, examples of the polymer should not be limited. Above all, preferred are (meth) acrylic monomers, Compounds A1-1 to 6 and A2-1 to 6. The compounds shown below are those of formula (1-1) where n1=0. Needless-to-say, however, compounds where n1 is from 1 to 3 are also within the scope of examples of the fluoroaliphatic group-containing monomer that gives the above repetitive unit A.

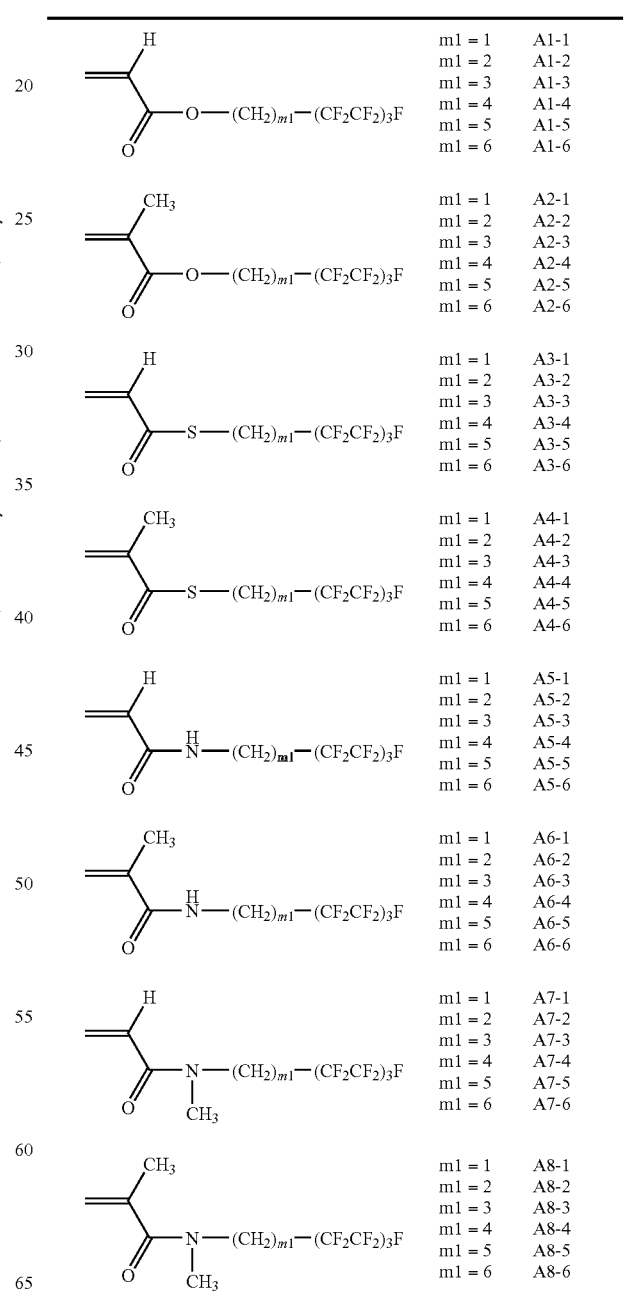

| | | |
|---|---|---|
| 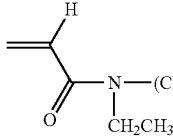 | m1 = 1<br>m1 = 2<br>m1 = 3<br>m1 = 4<br>m1 = 5<br>m1 = 6 | A9-1<br>A9-2<br>A9-3<br>A9-4<br>A9-5<br>A9-6 |
| 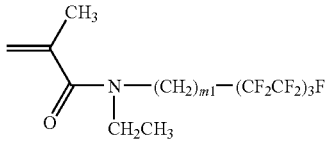 | m1 = 1<br>m1 = 2<br>m1 = 3<br>m1 = 4<br>m1 = 5<br>m1 = 6 | A10-1<br>A10-2<br>A10-3<br>A10-4<br>A10-5<br>A10-6 |
| 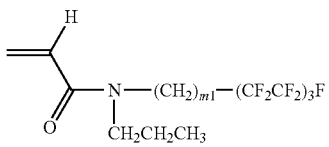 | m1 = 1<br>m1 = 2<br>m1 = 3<br>m1 = 4<br>m1 = 5<br>m1 = 6 | A11-1<br>A11-2<br>A11-3<br>A11-4<br>A11-5<br>A11-6 |
| 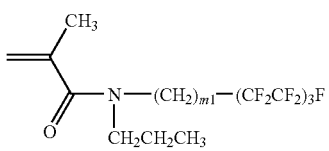 | m1 = 1<br>m1 = 2<br>m1 = 3<br>m1 = 4<br>m1 = 5<br>m1 = 6 | A12-1<br>A12-2<br>A12-3<br>A12-4<br>A12-5<br>A12-6 |
| 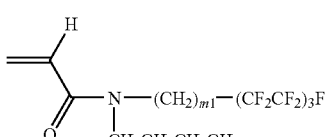 | m1 = 1<br>m1 = 2<br>m1 = 3<br>m1 = 4<br>m1 = 5<br>m1 = 6 | A13-1<br>A13-2<br>A13-3<br>A13-4<br>A13-5<br>A13-6 |
| 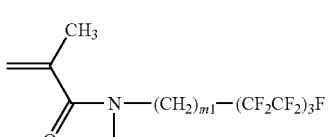 | m1 = 1<br>m1 = 2<br>m1 = 3<br>m1 = 4<br>m1 = 5<br>m1 = 6 | A14-1<br>A14-2<br>A14-3<br>A14-4<br>A14-5<br>A14-6 |

Examples of the fluoroaliphatic group-containing monomer that gives the above repetitive unit B are shown below, to which, however, examples of the monomer should not be limited. Above all, preferred are (meth) acrylic monomers, Compounds B1-1 to 6 and B2-1 to 6.

| | | |
|---|---|---|
| 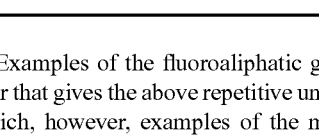 | m2 = 1<br>m2 = 2<br>m2 = 3<br>m2 = 4<br>m2 = 5<br>m2 = 6 | B1-1<br>B1-2<br>B1-3<br>B1-4<br>B1-5<br>B1-6 |
| 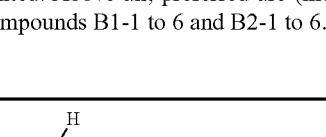 | m2 = 1<br>m2 = 2<br>m2 = 3<br>m2 = 4<br>m2 = 5<br>m2 = 6 | B2-1<br>B2-2<br>B2-3<br>B2-4<br>B2-5<br>B2-6 |
| 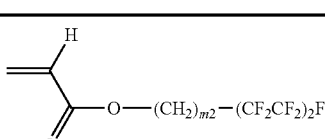 | m2 = 1<br>m2 = 2<br>m2 = 3<br>m2 = 4<br>m2 = 5<br>m2 = 6 | B3-1<br>B3-2<br>B3-3<br>B3-4<br>B3-5<br>B3-6 |
| 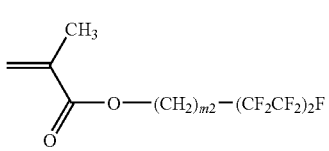 | m2 = 1<br>m2 = 2<br>m2 = 3<br>m2 = 4<br>m2 = 5<br>m2 = 6 | B4-1<br>B4-2<br>B4-3<br>B4-4<br>B4-5<br>B4-6 |
| 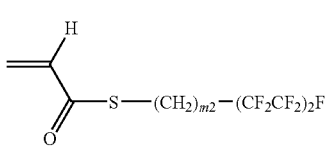 | m2 = 1<br>m2 = 2<br>m2 = 3<br>m2 = 4<br>m2 = 5<br>m2 = 6 | B5-1<br>B5-2<br>B5-3<br>B5-4<br>B5-5<br>B5-6 |
| 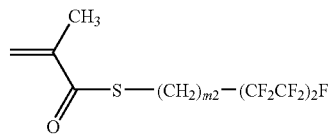 | m2 = 1<br>m2 = 2<br>m2 = 3<br>m2 = 4<br>m2 = 5<br>m2 = 6 | B6-1<br>B6-2<br>B6-3<br>B6-4<br>B6-5<br>B6-6 |
| 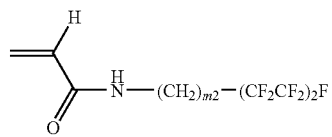 | m2 = 1<br>m2 = 2<br>m2 = 3<br>m2 = 4<br>m2 = 5<br>m2 = 6 | B7-1<br>B7-2<br>B7-3<br>B7-4<br>B7-5<br>B7-6 |
| 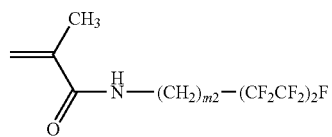 | m2 = 1<br>m2 = 2<br>m2 = 3<br>m2 = 4<br>m2 = 5<br>m2 = 6 | B8-1<br>B8-2<br>B8-3<br>B8-4<br>B8-5<br>B8-6 |
| 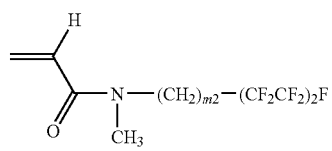 | m2 = 1<br>m2 = 2<br>m2 = 3<br>m2 = 4<br>m2 = 5<br>m2 = 6 | B9-1<br>B9-2<br>B9-3<br>B9-4<br>B9-5<br>B9-6 |
| 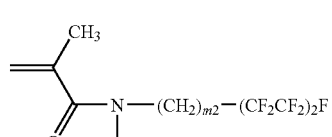 | m2 = 1<br>m2 = 2<br>m2 = 3<br>m2 = 4<br>m2 = 5<br>m2 = 6 | B10-1<br>B10-2<br>B10-3<br>B10-4<br>B10-5<br>B10-6 |
| 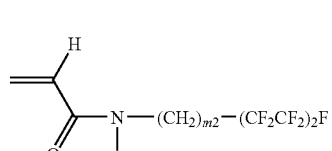 | m2 = 1<br>m2 = 2<br>m2 = 3<br>m2 = 4<br>m2 = 5<br>m2 = 6 | B11-1<br>B11-2<br>B11-3<br>B11-4<br>B11-5<br>B11-6 |
| 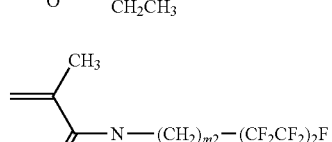 | m2 = 1<br>m2 = 2<br>m2 = 3<br>m2 = 4<br>m2 = 5<br>m2 = 6 | B12-1<br>B12-2<br>B12-3<br>B12-4<br>B12-5<br>B12-6 |
| 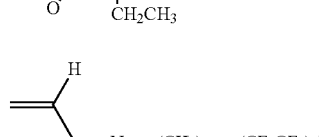 | m2 = 1<br>m2 = 2<br>m2 = 3<br>m2 = 4<br>m2 = 5<br>m2 = 6 | B13-1<br>B13-2<br>B13-3<br>B13-4<br>B13-5<br>B13-6 |

-continued

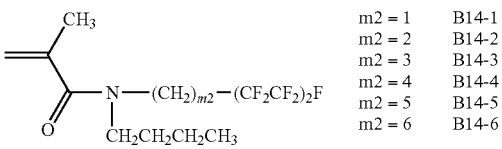

| | |
|---|---|
| m2 = 1 | B14-1 |
| m2 = 2 | B14-2 |
| m2 = 3 | B14-3 |
| m2 = 4 | B14-4 |
| m2 = 5 | B14-5 |
| m2 = 6 | B14-6 |

The fluoroaliphatic group-containing monomer may be prepared according to a telomerization method, occasionally referred to as telomer method, or an oligomemerization, occasionally referred to as oligomer method. Examples of preparation of the fluoroaliphatic compound are group-containing compound are described on pages 117 to 118 in "Synthesis and Function of Fluoride Compounds (Fussokagouibutsu no Gousei to Kinou)" overseen by ISHIKAWA NOBUO and published by CMC Publishing Co., Ltd. in 1987; and on pages 747 to 752 in "Chemistry of Organic Fluorine Compounds II", Monograph 187, Ed by Milos Hudlicky and Attila E. Pavlath, American Chemical Society 1995; and the like. The telomerization method is a method for producing a telomer by carrying out radical polymerization of fluorine-containing compound such as tetrafluoroethylene in the presence of an alkylhalide such as iodide, having a large chain-transfer constant number, as a telogen. One example is shown in Scheme-I.

Scheme 1

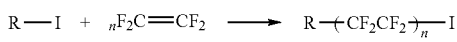

The obtained fluorine-terminated telomers are usually terminal-modified properly as shown in Scheme 2, to give fluoro-aliphatic compounds.

Scheme 2

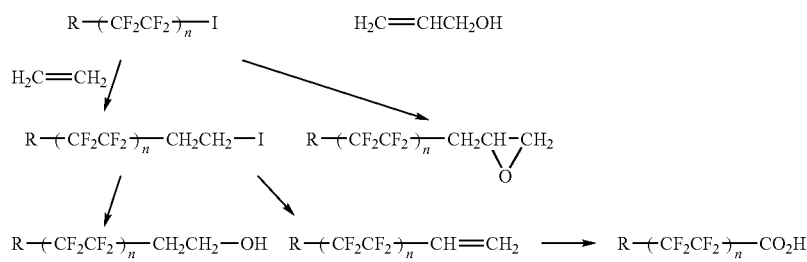

In the formula (1-1), each M is a repetitive unit derived from an ethylenic unsaturated monomer. M is preferably selected, however not limited to, repetitive units having a polar group capable of hydrogen bonding in the side chain. M is preferably a repetitive unit represented by the formula (2).

Formula (2)

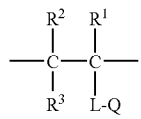

In the formula (2), $R^1$, $R^2$ and $R^3$ each independently represent a hydrogen atom, an alkyl group, a halogen atom or a group represented by -L-Q. L represents a divalent linking group and Q represents a polar group capable of hydrogen bonding.

In the formula, L preferably represents a divalent linking group selected from the Linking Group shown below or a divalent linking group consisting of two or more selected from the Linking Group shown below;

(Linking Group)
a single bond, —O—, —CO—, —$NR^4$— where $R^4$ represents a hydrogen atom, an alkyl group, an aryl group or an aralkyl group), —S—, —$SO_2$—, —P(=O)($OR^5$)— where $R^5$ represents an alkyl group, an aryl group or an aralkyl group), an alkylene group and arylene group.

In the formula (2), in particular, $R^1$, $R^2$ and $R^3$ each independently represent a hydrogen atom, an alkyl group, a halogen atom (such as fluorine, chlorine, bromine and iodine atoms) or a group represented by -L-Q, described hereinafter; preferably a hydrogen atom, a $C_{1-6}$ alkyl group, a chlorine atom or a group represented by -L-Q; more preferably a hydrogen atom or a $C_{1-4}$ alkyl group; and further more preferably a hydrogen atom or a $C_{1-2}$ alkyl group. Examples of the alkyl group represented by $R^1$, $R^2$ or $R^3$ include methyl, ethyl, n-propyl, b-butyl and sec-butyl. The alkyl group may have at least one substituent, and examples of the substituent include halogen atoms, an aryl group, a heterocyclic group, an alkoxy group, an aryloxy group, an alkylthio group, an arylthio group, an acyl group, hydroxyl, an acyloxy, an amino group, an alkoxycarbonyl group, an acylamino group, an oxycarbonyl group, a carbamoyl group, a sulfonyl group, a sulfamoyl group, a sulfonamido group, a sulforyl group and a carboxyl group.

The number of carbon atoms in an alkyl means that in an alkyl moiety, and if the alkyl has any substituent, carbon atoms in the substituent are not counted. The term "the number of carbon atoms" has the same meaning hereinafter.

In the formula, L represents a single bond, —O—, —CO—, —$NR^4$— where $R^4$ represents a hydrogen atom, an alkyl group, an aryl group or an aralkyl group), —S—, —$SO_2$—, —P(=O) ($OR^5$)— where $R^5$ represents an alkyl group, an aryl group or an aralkyl group), an alkylene group or arylene group, or a divalent linking group consisting of two or more selected therefrom. L preferably represents a single bond, —O—, —CO—, —$NR^4$—, —S—, —$SO_2$—, an alkylene group or an arylene group; and more preferably —CO—, —O—, —$NR^4$—, an alkylene group or an arylene group. And preferably, L contains an alkyleneoxy moiety having both of —O— and an alkylene or a polyalkyleneoxy, that is, containing repeated plural alkyleneoxy moieties.

Regarding L containing at least one alkyl moiety, the number of carbon atoms in the alkyl moiety is preferably from 1 to 10, more preferably from 1 to 8, and much more preferably from 1 to 6. Preferred examples of the alkylene moiety include methylene, ethylene, tri-methylene, tetra-butylene and hexa-methylene. The alkylene moiety (this term is used for not only any alkyl groups but also alkylene moieties in any alkyleneoxy groups) may have a branched chain structure; and the number of carbon atoms in the branched moiety is preferably from 1 to 3.

Regarding L containing at least one aryl moiety, the number of carbon atoms in the arylene moiety is preferably from 6 to 24, more preferably from 6 to 18, and much more preferably from 6 to 12. Preferred examples of the arylene moiety include phenylene and naphthalene.

Regarding L containing a divalent linking moiety consisting of a combination of an alkylene group and an arylene group, or in other words an aralkyl moiety, the number of carbon atoms in the aralkyl moiety is preferably from 7 to 34, more preferably from 7 to 26 and much more preferably from 7 to 16. Preferred examples of the aralkyl moiety include phenylene methylene, phenylene ethylene and methylene phenylene.

L may have any substituent. Examples of the substituent are same as those exemplified for the substituent of $R^1$, $R^2$ or $R^3$.

Examples of L include, however not to be limited to, those shown below.

L-1
Single bond

L-2
—COO—(CH$_2$)$_2$—

L-3
—COO—(CH$_2$)$_3$—

L-4
—COO—(CH$_2$)$_5$—

L-5
—COO—(CH$_2$)$_8$—

L-6
—COO—(CH$_2$)$_{11}$—

L-7
$$—COO—(CH_2)_3—\underset{\underset{CH_3}{|}}{C}HCH_2—$$

L-8
—CONH—(CH$_2$)$_3$—

L-9
—CONH—(CH$_2$)$_5$—

L-10
$$—\underset{\underset{CH_3}{|}}{C}ON—(CH_2)_8—$$

L-11
—CONH—(CH$_2$)$_{11}$—

L-12
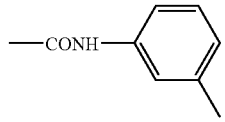

L-13
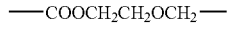

L-14

L-15

L-16
—COOCH$_2$CH$_2$OCH$_2$—

L-17
—COO—(CH$_2$CH$_2$O)$_2$—CH$_2$—

L-18
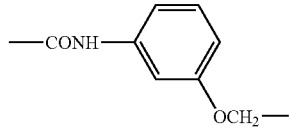

L-19
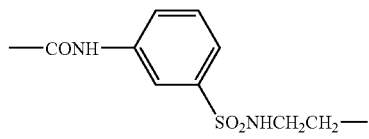

L-20
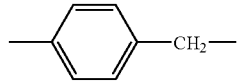

L-21
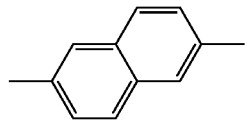

L-22
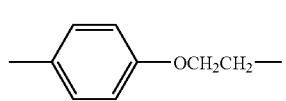

L-23
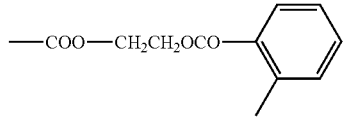

L-24
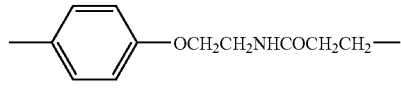

L-25
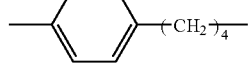

L-26
—(CH$_2$)$_5$—

L-27
—O—(CH$_2$)$_4$—O—CH$_2$—

L-28
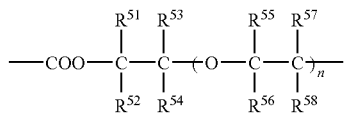

In the formula L-28, $R^{51}$ to $R^{58}$ each independently represent a hydrogen atom or an alkyl group (preferably a $C_{1-4}$ and more preferably $C_{1-2}$ alkyl group); and n is an integer from 1 to 12 (preferably from 2 to 10). Preferably, for each of combinations of $R^{53}$ and $R^{54}$, $R^{55}$ and $R^{56}$, and $R^{57}$ and $R^{58}$, one is a hydrogen atom and another is an alkyl group.

In the formula, Q represents a polar group capable of hydrogen bonding. Preferred examples of Q include hydroxy, carboxyl, any carboxylates such as lithium carboxylate, sodium carboxylate, potassium carboxylate, ammonium carboxylate (for example, unsubstituted ammonium carboxylate, tetramethylammonium carboxylate, trimethyl-2-hydroxyethylammonium carboxylate, tetrabutylammonium carboxylate, trimethylbenzylammonium carboxylate or dimethylphanylammonium carboxylate) or pyridinium carboxylate; carboxamidos (N-unsubstituted or N-substituted with mono low alkyl carboxyamidos) such as —CONH$_2$ and —CONHCH$_3$; sulfo, any sulfates (examples of a counter cation are same as those exemplified for the carboxylate above); sulfonamidos (N-unsubstituted or N-substituted with mono low alkyl sulfonamidos) such as —SO$_2$NH$_2$ and —SO$_2$NHCH$_3$; phosphono, phosphonoxylates (examples of a counter cation are same as those exemplified for the carboxylate above); phosphonamidos N-unsubstituted or N-substituted with mono low alkyl phosphonamidos) such as —OP(=O) (NH$_2$)$_2$ and —OP(=O) (NHCH$_3$)$_2$; ureido (—NHCONH$_2$); and N-substituted or N-monosubstituted aminos such as —NH$_2$ and —NHCH$_3$. The term "low alkyl" means methyl and ethyl.

More preferred examples of Q include hydroxyl, carboxyl, sulfo and phosphono, much more preferred are hydroxyl and carboxyl; and most preferred is hydroxyl.

The repetitive unit represented by the formula (2) is preferably selected from repetitive units derived from (meth) acrylates.

Examples of the monomer to give the repetitive unit M include, however are not limited to, those shown below.

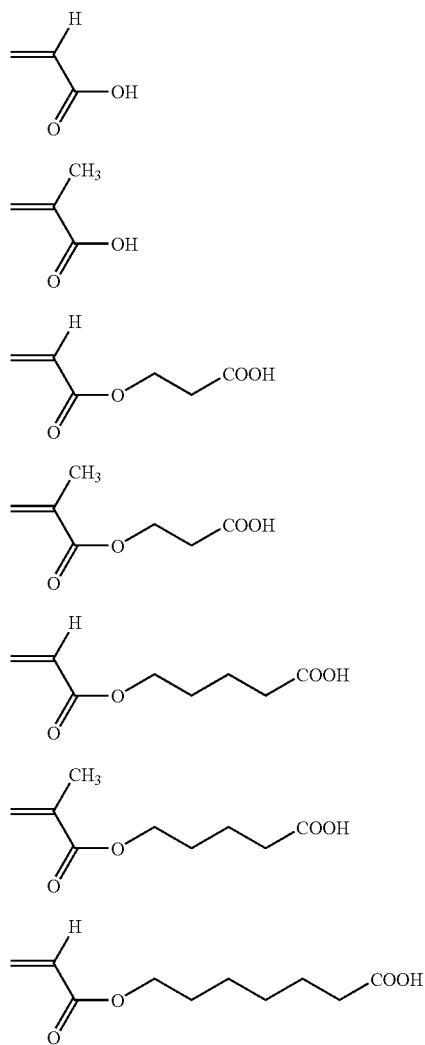

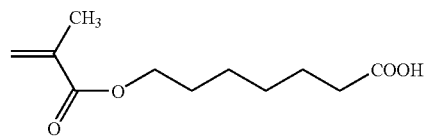

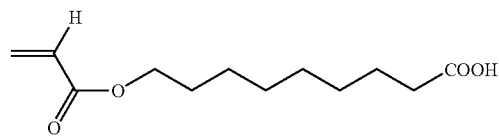

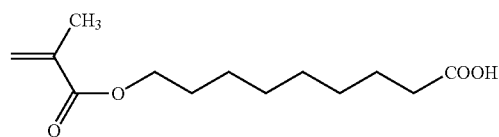

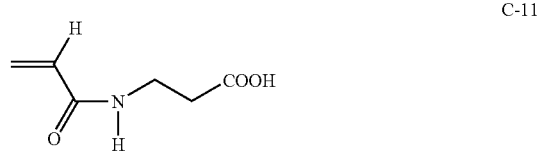

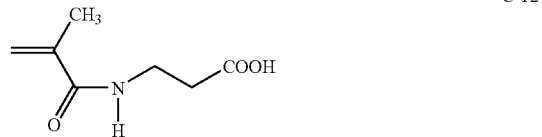

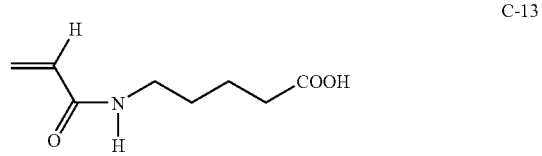

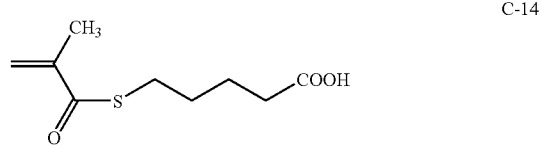

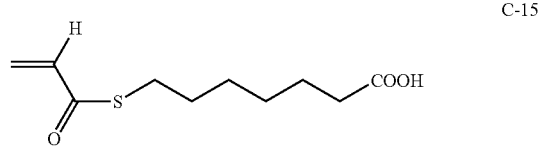

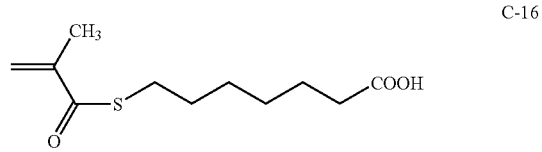

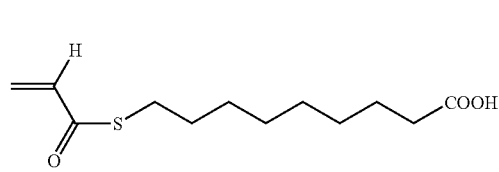

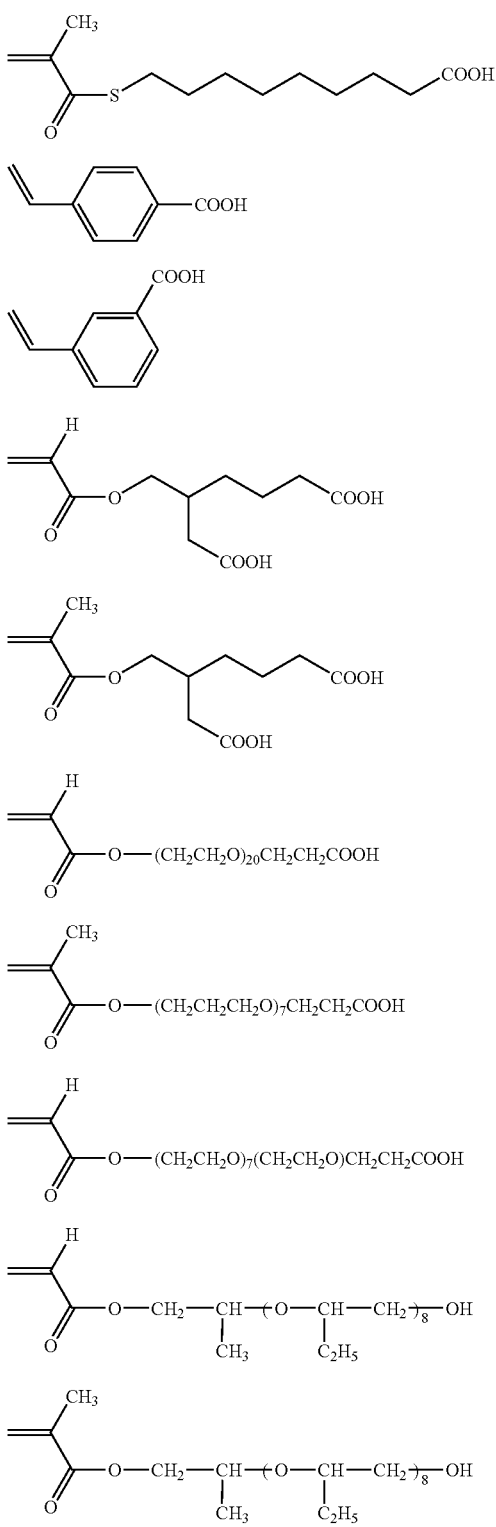

The fluoroaliphatic group-containing polymer represented by the formula (1-1) comprises at least one repetitive unit A, at least one repetitive unit B, and at least one repetitive unit M. Specifically, in the formula (1-1), i, j and k each indicating the number of the respective repetitive units are individually integers equal to or more than 1. The fluoroaliphatic group-containing polymer of the formula (1-1) may comprise two or more different types of the respective repetitive units, and may comprise any other repetitive units than the repetitive units A, B and M. Examples of the monomer which can give the other repetitive unit include, however not to be limited to, Monomer Group I shown below.

(Monomer Group I)

(1) Alkenes:

ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifuluoropropylene, tetrafluoroethylene, vinyl chloride, vinylidene chloride or the like;

(2) Dienes:

1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphtyl-1,3-butadiene, 1-β-naphtyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinyl cyclohexane or the like;

(3) α,β-Unsaturated Carboxylic Acid Derivatives:

(3a) Alkyl Acrylates:

methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxy polyethyleneglycol acrylate (having additional molar number, n, of 2 to 100), 3-metoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;

(3b) Alkyl Methacrylates:

methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetarahydrofurfuryl methacrylate, crezyl methacrylate, naphthyl methacrylate, 2-methoxyethyl methacrylate, 3-methoxybutyl methacrylate, ω-methoxypolyethyleneglycol methacrylate (having additional molar number, n, of 2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimetoxysilylpropyl methacrylate, allyl methacrylate, 2-isosyanate ethyl methacrylate or the like;

(3c) Diesters of Unsaturated Polycarboxylic Acids:

dimethyl maleate, dibutyl maleate, dimethyl itaconate, dibutyl itaconate, dibutyl crotonate, dihexyl crotonate, diethyl fumarate, dimethyl fumarate or the like;

(3d) Amides of α,β-Unsaturated Carboxylic Acids:

N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;

(4) Unsaturated Nitriles:
acrylonitrile, methacrylonitrile or the like;
(5) Styrene or Derivatives Thereof:
styrene, vinyltoluene, ethylstyrene, p-tert-butylstyrene, p-vinyl methyl benzoate, α-methyl styrene, p-chloromethyl styrene, vinyl naphthalene, p-methoxy styrene, p-hydroxy methyl styrene, p-acetoxy styrene or the like;
(6) Vinyl Esters:
vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;
(7) Vinyl Ethers:
methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and
(8) Other Monomers
N-vinyl pyrrolidone, methyl vinyl ketone, phenyl vinyl ketone, methoxy ethyl vinyl ketone, 2-vinyl oxazoline, 2-isoprppenyl oxazoline or the like.

In formula (1-1), a, b and c each mean a mass percentage indicating a polymerization ratio of the monomers that give each of the repetitive units; Σai means a numerical value of from 1 to 98% by mass; Σbj means a numerical value of from 1 to 98% by mass; Σck means a numerical value of from 1 to 98% by mass. Preferably, Σai is from 5 to 40% by mass; Σbj is from 5 to 40% by mass; Σck is from 20 to 90% by mass, and more preferably Σai is from 10 to 35% by mass; Σbj is from 10 to 35% by mass; Σck is from 30 to 80% by mass. The fluoroaliphatic group-containing polymer of formula (1-1) may contain any other repetitive units than the above repetitive units A, B and M; or that is, Σai+Σbj+Σck<100% by mass. Preferably, however, the polymer does not contain any other repetitive units than the above repetitive units A, B and M; or that is, it is desirable that Σai+Σbj+Σck=100% by mass.

The proportion of the repetitive units A and B derived from fluoroaliphatic group-containing monomers, which are in the fluoroaliphatic group-containing polymer, is preferably within a predetermined range, as effective for reducing the occurrence of unevenness in the initial stage of drying. Concretely, the sum of the total mass Σai of a number i repetitive units A, the total mass Σbj of a number j repetitive units B, (Σai+Σbj) is preferably from 20 to 50% by mass, more preferably from 25 to 45% by mass, even more preferably from 25 to 40% by mass. When (Σai+Σbj) is less than 20% by mass, then the control of liquid-crystal compound in air interface may be insufficient, and the effect of the invention for reducing the unevenness of the optical film may be poor; but when it is more than 50% by mass, then the coatability of the liquid crystalline composition applied to a surface (for example, a surface of a transparent support such as a polymer film) may be insufficient, therefore causing eye holes (hajiki). In case where (Σai+Σbj) falls within the above range, the composition is free from the problems and may reduce more effectively the unevenness in initial drying.

From the same viewpoint, the ratio of Σai to (Σai+Σbj), (Σai/(Σai+Σbj)) is preferably from 0.2 to 0.8, more preferably from 0.3 to 0.6, still more preferably from 0.35 to 0.55. When the ratio (Σai/(Σai+Σbj)) is less than 0.2, then the control of the liquid-crystal compound in air interface may be insufficient, and the effect of the invention for reducing the unevenness of the optical film may be poor; but when it is more than 0.8, then the coatability of the liquid crystalline composition applied to a surface (for example, a surface of a transparent support such as a polymer film) may be insufficient, therefore causing eye holes (hajiki). In case where (Σai/(Σai+Σbj)) falls within the above range, the composition is free from the problems and may reduce more effectively the unevenness in initial drying, and therefore it is favorable.

Specific examples of the fluoroaliphatic group-containing polymer usable in the first invention are shown below, to which, however, examples of the polymer should not be limited. In the following Table, the repetitive units A, B and M are specifically indicated by the number of the monomer compounds that give the respective units.

| Polymer No. | Repetitive Unit A (Σai: mas. %) | Repetitive Unit B (Σbj: mas. %) | Repetitive Unit M (Σck: mas. %) |
| --- | --- | --- | --- |
| P1-1 | A1-2 (20) | B1-2 (20) | C-27 (60) |
| P1-2 | A1-2 (10) | B1-2 (30) | C-27 (60) |
| P1-3 | A1-2 (20) | B1-2 (20) | C-26 (60) |
| P1-4 | A1-2 (10) | B1-2 (30) | C-26 (60) |
| P1-5 | A1-2 (25) | B1-2 (25) | C-23 (50) |
| P1-6 | A1-2 (30) | B1-2 (5) | C-24 (65) |
| P1-7 | A1-2 (35) | B1-2 (5) | C-26 (60) |
| P1-8 | A1-2 (40) | B1-2 (10) | C-26 (50) |
| P1-9 | A1-4 (20) | B1-4 (20) | C-23 (60) |
| P1-10 | A1-4 (10) | B1-4 (30) | C-24 (60) |
| P1-11 | A1-4 (20) | B1-4 (20) | C-26 (60) |
| P1-12 | A1-4 (10) | B1-4 (30) | C-26 (60) |
| P1-13 | A1-4 (25) | B1-4 (25) | C-23 (50) |
| P1-14 | A1-4 (30) | B1-4 (5) | C-24 (65) |
| P1-15 | A1-4 (35) | B1-4 (5) | C-26 (60) |
| P1-16 | A1-4 (40) | B1-4 (10) | C-26 (50) |
| P1-17 | A2-2 (20) | B2-2 (20) | C-27 (60) |
| P1-18 | A2-2 (25) | B2-2 (25) | C-27 (50) |
| P1-19 | A2-2 (10) | B2-2 (30) | C-26 (60) |
| P1-20 | A2-2 (25) | B2-2 (25) | C-26 (50) |
| P1-21 | A2-4 (20) | B2-4 (20) | C-27 (60) |
| P1-22 | A2-4 (20) | B2-4 (20) | C-26 (60) |

The liquid crystalline composition of the first invention may contain at least one of the above-mentioned fluoroaliphatic group-containing polymers, but may contain two or more different types of the polymers. In the composition, the amount of the fluoroaliphatic group-containing polymer is preferably from 0.01 to 20% by mass of the liquid-crystal compound (preferably discotic liquid-crystal compound) therein, more preferably from 0.05 to 10% by mass, even more preferably from 0.1 to 5% by mass.

The preferred range of the concentration, C % by mass, of the fluoroaliphatic group-containing polymer in the composition (in case where the composition is prepared as a coating liquid, this is in the solid content of the liquid composition) varies, depending on the fluorine content, F % of the fluoroaliphatic group-containing polymer. For more effectively reducing the unevenness in initial drying, the product of the fluoroaliphatic group-containing polymer concentration, C % by mass and the fluorine content, F % of the fluoroaliphatic group-containing polymer is preferably from 0.05 to 0.12, more preferably from 0.06 to 0.09, even more preferably from 0.06 to 0.08. When C×F is less than 0.05, then the control of the liquid-crystal compound in air interface may be insufficient, and the outward appearance characteristic (degree of uniformity) may be bad; but when it is more than 0.12, then the coatability of the liquid crystalline composition applied to a surface (for example, a surface of a transparent support such as a polymer film) may be insufficient, therefore worsening the outward appearance characteristic of the optical film (causing eye holes (hajiki)). When C×F falls within the above range, then the composition is free from the problems and may reduce more effectively the unevenness in initial drying.

Second Fluoroaliphatic Group-Containing Polymer:

The liquid crystalline composition of the first invention may contain at least one other fluoroaliphatic group-containing polymer (this may be hereinafter referred to as "second fluoroaliphatic group-containing polymer") falling outside the scope of the above-mentioned fluoroaliphatic group-containing polymer (this may be hereinafter referred to as "first fluoroaliphatic group-containing polymer"). Preferably, the second fluoroaliphatic group-containing polymer comprises at least one repetitive unit derived from a fluoroaliphatic group-containing monomer and at least one repetitive unit derived from a monomer having an acidic group such as a carboxyl group (—COOH) or its salt, a sulfo group (—SO$_3$H) or its salt, or a phosphonoxy group {—OP(=O)(OH)$_2$} or its salt.

Preferred examples of the second fluoroaliphatic group-containing polymer include polymer A, described in WO2006/001504, which is a copolymer comprising a repetitive unit derived from a fluoroaliphatic group-containing polymer and a repetitive unit represented by a formula (1a) shown below.

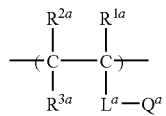

Formula (1a)

In the formula, $R^{1a}$, $R^{2a}$ and $R^{3a}$ each independently represent a hydrogen atom or a substituent; and $L^a$ represents a divalent linking group selected from the Linking Group shown below or a divalent linking group consisting of two or more selected from the Linking Group shown below;

(Linking Group)

a single bond, —O—, —CO—, —NR$^{4a}$— where R$^{4a}$ represents a hydrogen atom, an alkyl group, an aryl group or an aralkyl group), —S—, —SO$_2$—, —P(=O)(OR$^{5a}$)— where R$^{5a}$ represents an alkyl group, an aryl group or an aralkyl group), an alkylene group and arylene group.

$Q^a$ represents carboxyl (—COOH) or any salt thereof, sulfo (—SO$_3$H) or any salt thereof, or phosphonoxy {—OP(=O)(OH)$_2$} or any salt thereof.

In the formula (1a), $R^{1a}$, $R^{2a}$, $R^{3a}$ and $L^a$ each have a same meaning as those of $R^1$, $R^2$, $R^3$ and L in the formula (2); and their preferred scope are same as those of $R^1$, $R^2$, $R^3$ and L in the formula (2)

The repetitive unit derived from the fluoroaliphatic group-containing monomer of the second fluoroaliphatic group-containing polymer may be selected from above described repetitive units A or B, as well as from repetitive units derived from any monomers represented by a formula (3).

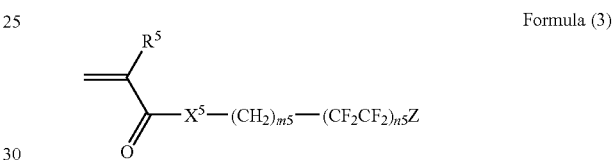

Formula (3)

In the formula (3), $R^5$ represents a hydrogen atom or methyl; $X^5$ represents an oxygen atom, sulfur atom or —N(R$^{15}$)— where R$^{15}$ represents a hydrogen atom or C$_{1-4}$ alkyl; Z represents a hydrogen atom or fluorine atom; m$^5$ is an integer from 1 to 6; and n$^5$ is an integer from 2 to 4.

The second fluoroaliphatic group-containing polymer may comprise a repetitive unit, represented by the formula (2), having a polar group capable of hydrogen bonding, and/or at least one repetitive unit derived from any monomer selected from Monomer Group (1)-(7) described above. Examples of the second fluoroaliphatic group-containing polymer employable include, but are not limited to, those shown below.

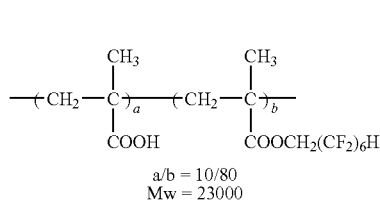

Q-1

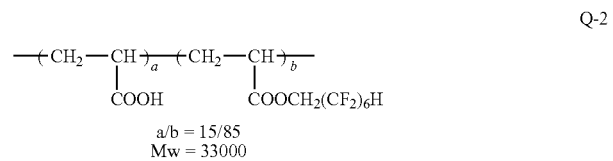

Q-2

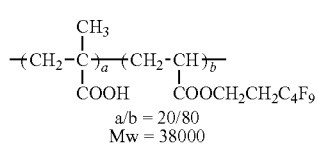

Q-3

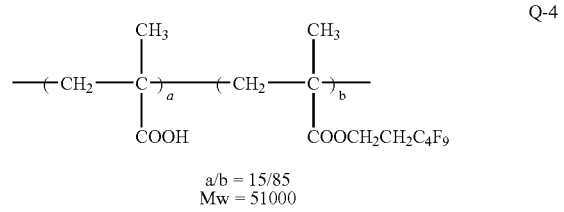

Q-4

-continued
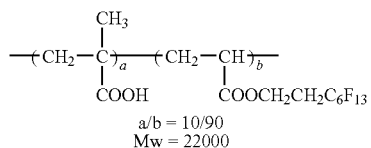
Q-5
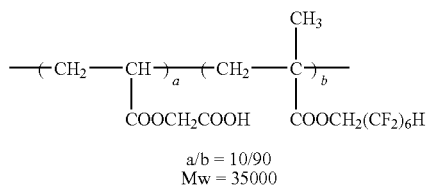
Q-6
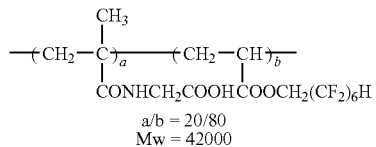
Q-7
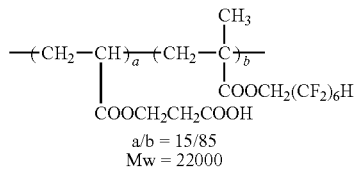
Q-8
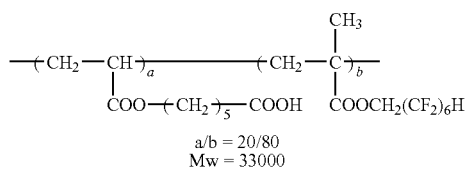
Q-9
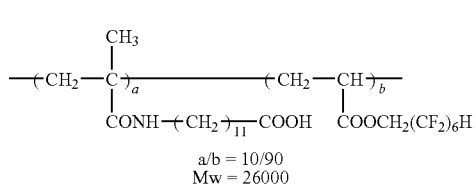
Q-10
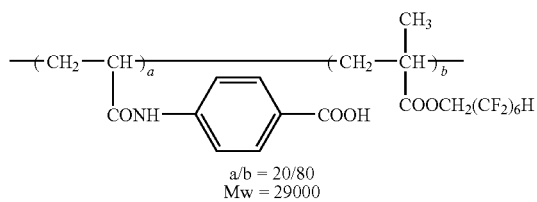
Q-11
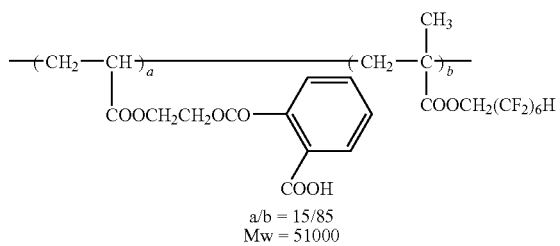
Q-12
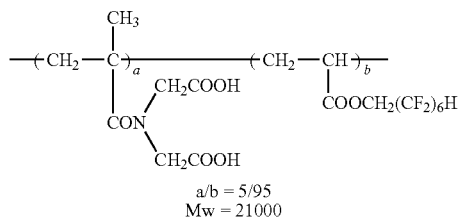
Q-13
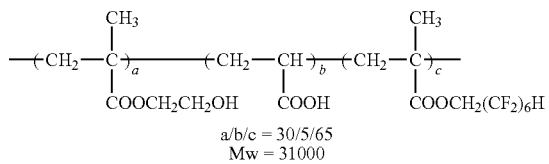
Q-14
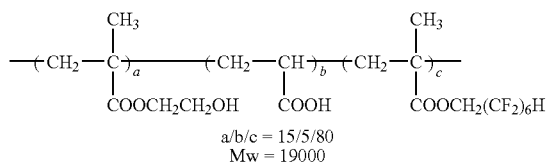
Q-15
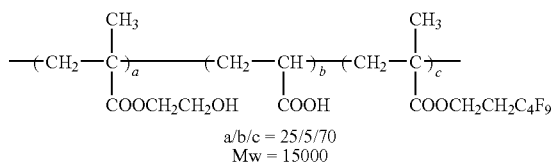
Q-16
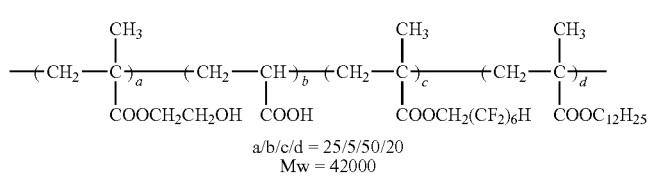
Q-17

-continued
Q-18
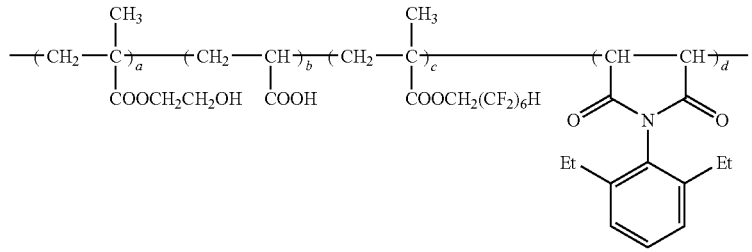
a/b/c/d = 32/6/30/32
Mw = 16000
Q-19
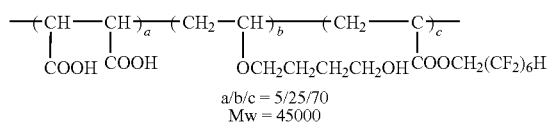
a/b/c = 5/25/70
Mw = 45000
Q-20
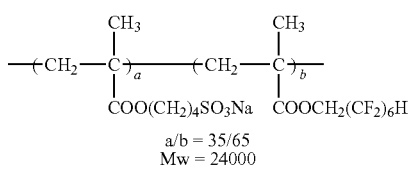
a/b = 35/65
Mw = 24000
Q-21
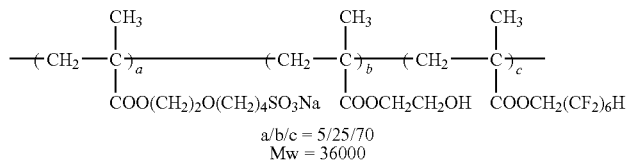
a/b/c = 5/25/70
Mw = 36000
Q-22
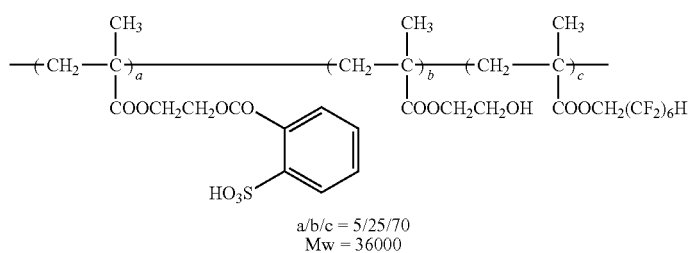
a/b/c = 5/25/70
Mw = 36000
Q-23
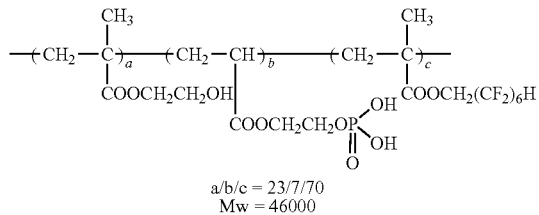
a/b/c = 23/7/70
Mw = 46000
Q-24
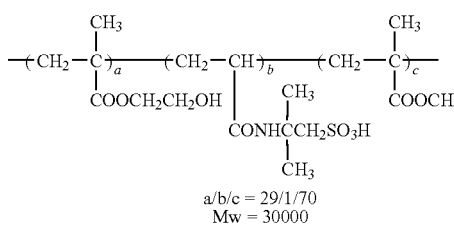
a/b/c = 29/1/70
Mw = 30000
Q-25
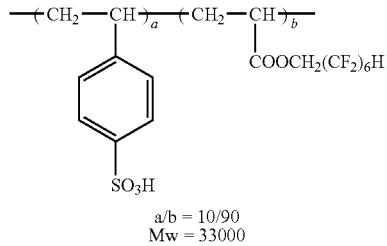
a/b = 10/90
Mw = 33000
Q-26
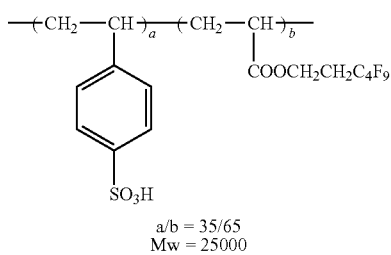
a/b = 35/65
Mw = 25000

-continued

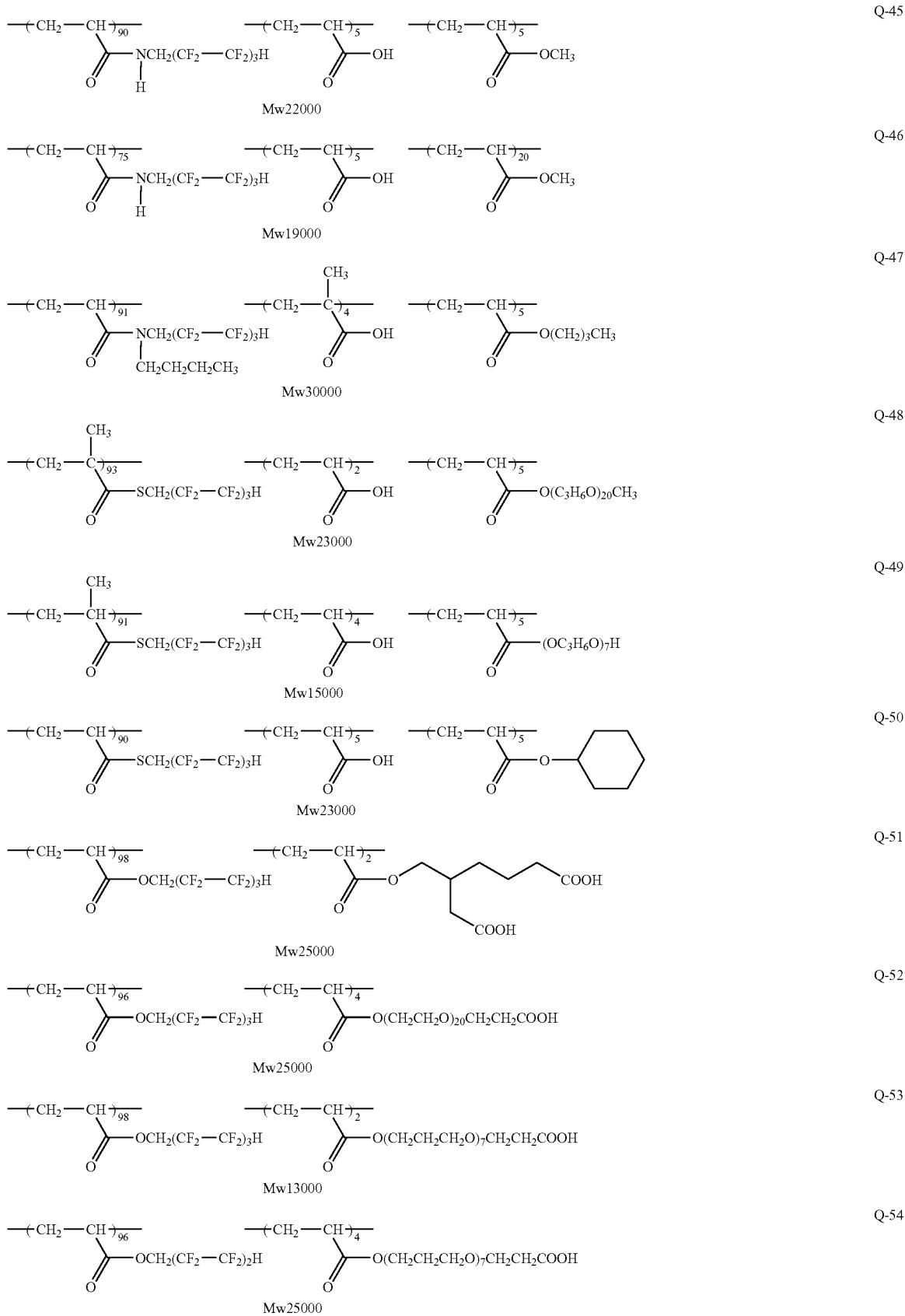

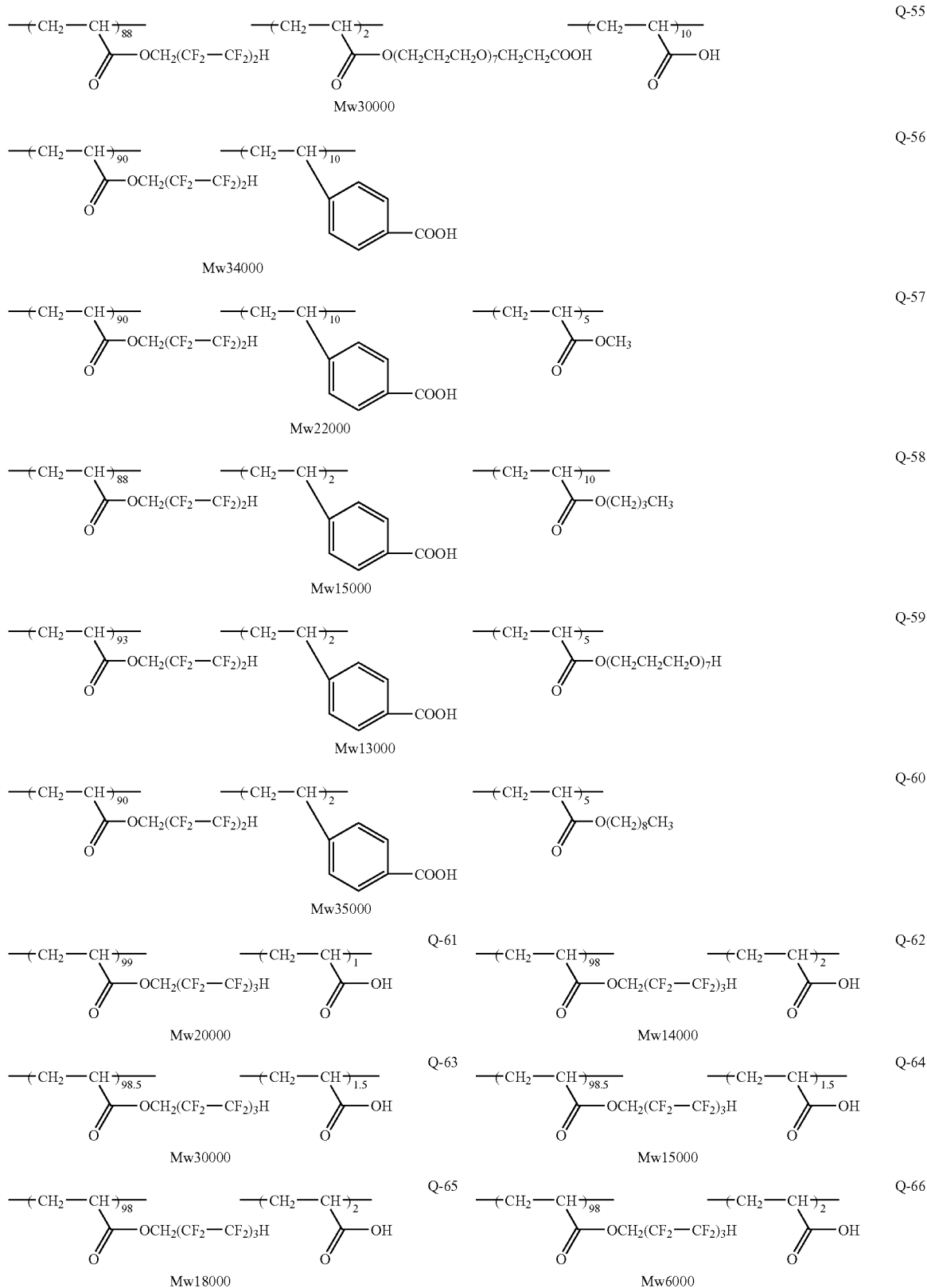

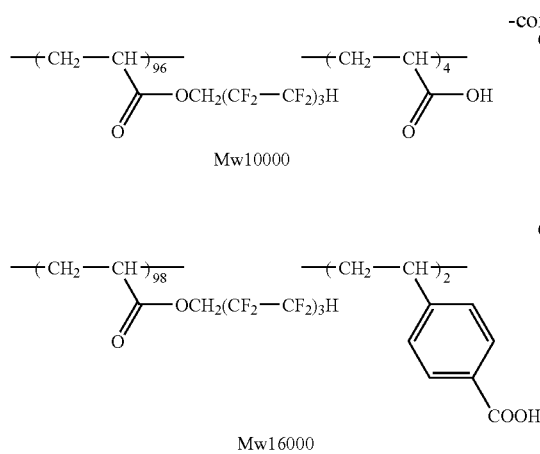

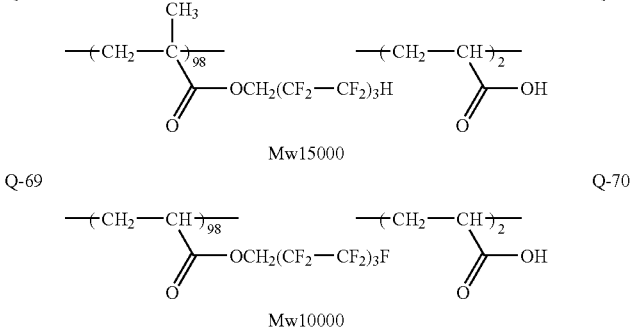

In the embodiment of adding the second fluoroaliphatic group-containing polymer, the amount of the second fluoroaliphatic group-containing polymer (% by mass) is preferably not larger than the amount of the first fluoroaliphatic group-containing polymer (% by mass).

Preferably, the weight-average molecular weight of the first fluoroaliphatic group-containing polymer (and the optional component, second fluoroaliphatic group-containing polymer) is at most 1,000,000, more preferably at most 500,000, even more preferably at most 100,000.

The weight-average molecular weight is determined through gel permeation chromatography (GPC).

Examples of the method for producing the first fluoroaliphatic group-containing polymer (and the optional component, second fluoroaliphatic group-containing polymer) include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the fluoride-polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkenn-hoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 minutes to 30 hours. Inert gas purge is desirably performed before or while carrying out the solution polymerization to avoid deactivation of the generated radicals. Nitrogen gas is usually used as an inert gas.

Radical polymerization with at least one chain transfer agent is useful for producing the first fluoroaliphatic group-containing polymer (and the optional component, second fluoroaliphatic group-containing polymer) having a proper molecular weight. Examples of the chain transfer agent include mercaptans such as octyl mercaptan, decyl mercaptan, dodecyl mercaptan, tert-dodecyl mercaptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as α-methyl styrene or α-methyl styrene dimer. Among these, $C_{4-16}$ mercaptans are preferred. The amount of the chain transfer agent to be used should be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

Liquid Crystalline Composition:

The liquid-crystal compound for use in the liquid crystalline composition of the first invention is described below.

Examples of the liquid-crystal compound usable in the invention include rod-like liquid-crystal compounds and discotic liquid-crystal compounds. The rod-like liquid-crystal compounds and discotic liquid-crystal compounds may be polymer liquid crystals or low-molecular liquid crystals, and may also be crosslinked low-molecular liquid crystals that with no liquid crystallinity.

(Rod-Like Liquid Crystalline Compound)

Examples of the rod-like liquid crystalline compound, which can be preferably used in the present invention, include azomethines, azoxys, cyanobiphenyls, cyanophenyl esters, benzoate esters, cyclohexane carboxylic acid phenyl esters, cyanophenyl cyclohexanes, cyano-substituted phenyl pyrimidines, alkoxy-substituted phenyl pyrimidines, phenyl dioxanes, tolans and alkenyl cyclohexyl benzonitriles.

It is to be noted that examples of the rod-like liquid crystalline compound include metal complexes. And it is also possible to use, as a rod-like liquid crystalline compound, liquid crystalline polymers comprising a repeating unit having a residue of a rod-like liquid crystalline compound. Or, in other words, the rod-like liquid crystalline compound employable in the present invention may bind to a polymer.

Rod-like liquid-crystalline compounds are described in fourth, seventh and eleventh chapters of "Published Quarterly Chemical Review vol. 22 Chemistry of Liquid Crystals (Ekishyo no Kagaku)" published in 1994 and edited by Japan Chemical Society; and in third chapter of "Handbook of liquid Crystal Devices (Ekishyo Debaisu Handobukku)" edited by the 142 th committee of Japan Society for the Promotion of Science.

The rod-like liquid-crystalline compounds desirably have a birefringence index of 0.001 to 0.7.

The rod-like liquid-crystalline compounds desirably have one or more polymerizable groups for fixing themselves in an alignment state. Preferred examples of the polymerizable group include unsaturated polymerizable groups and epoxy group, and unsaturated polymerizable groups are more preferred, and ethylenic unsaturated polymerizable groups are much more preferred.

(Discotic Liquid Crystalline Compound)

Examples of discotic liquid-crystalline compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2, 655 (1994), J. Zhang et al.

Examples of the discotic liquid-crystalline compounds also include compounds having a discotic core and substituents, radiating from the core, such as a linear alkyl or alkoxy group or substituted benzoyloxy groups. It is preferred that molecules have rotational symmetries respectively or as a whole of molecular assembly to be aligned in an alignment state. The discotic liquid-crystalline compounds employed in preparing optically anisotropic layers are not required to maintain liquid crystallinity after contained in the optically anisotropic layers. For example, when a low-molecular-weight discotic liquid-crystalline compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. Preferred examples of the discotic liquid-crystalline compound are described in JPA No. hei 8-50206. The polymerization of discotic liquid-crystalline compounds is described in JPA No. hei 8-27284.

In order to fix the discotic liquid crystalline molecule by a polymerization, a polymerizable group has to be bonded as a substituent group to a disk-shaped core of the discotic liquid crystalline molecule. In a preferred compound, the disk-shaped core and the polymerizable group are preferably bonded through a linking group, whereby the aligned state can be maintained in the polymerization reaction. Preferred examples of the discotic liquid crystalline compound having a polymerizable group include the group represented by a formula (5) below.

$$D(-L^1Q^1)_n \qquad \text{Formula (5)}$$

In the formula, D is a disk-shaped core, $L^1$ is a divalent liking group, $Q^1$ is a polymerizable group and n is an integer from 4 to 12.

Examples of the disk-shaped core are shown below. In each of the examples, LQ or QL means the combination of the divalent linking group ($L^1$) and the polymerizable group ($Q^1$)

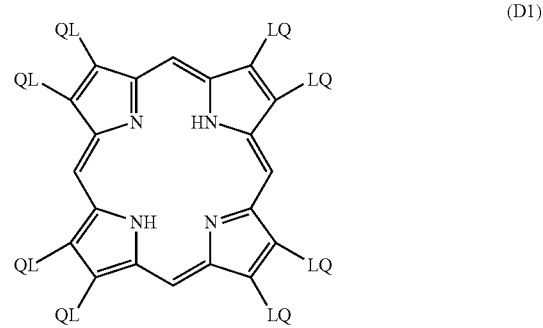

(D1)

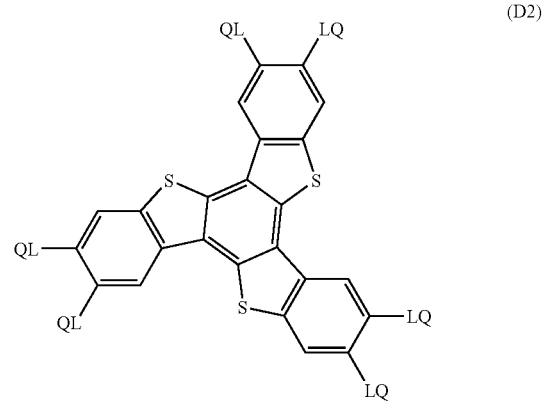

(D2)

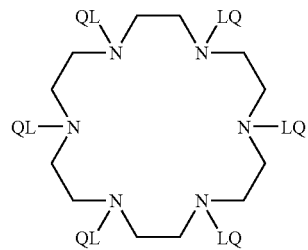
(D3)
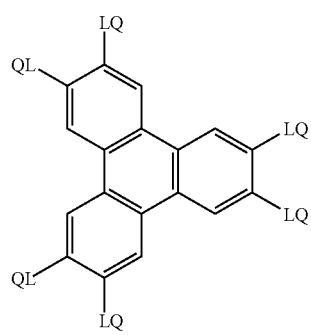
(D4)
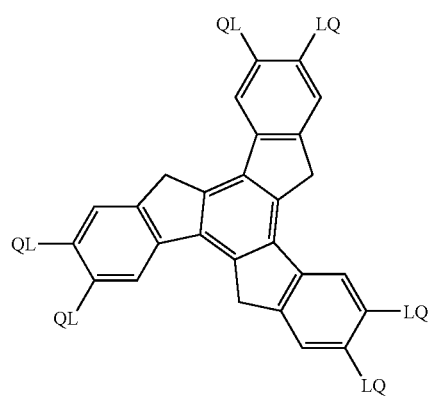
(D5)
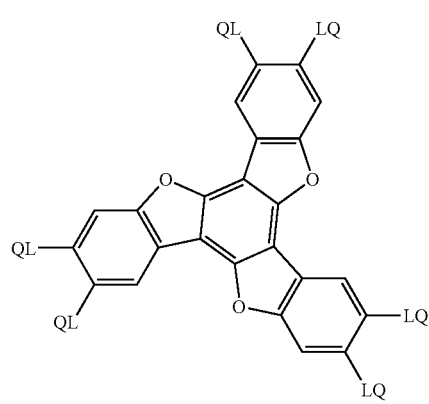
(D6)
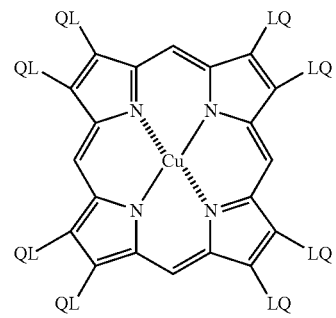
(D7)
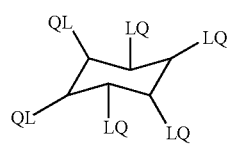
(D8)
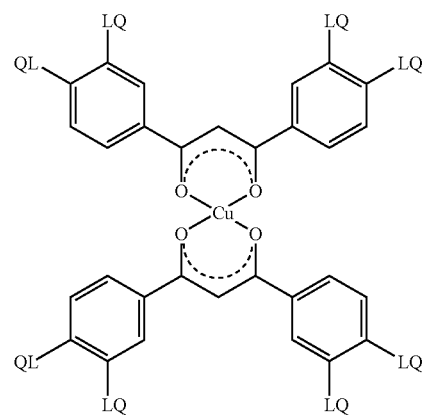
(D9)
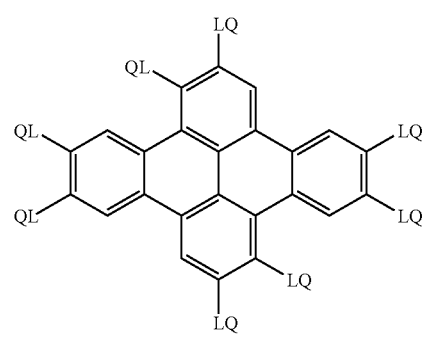
(D10)

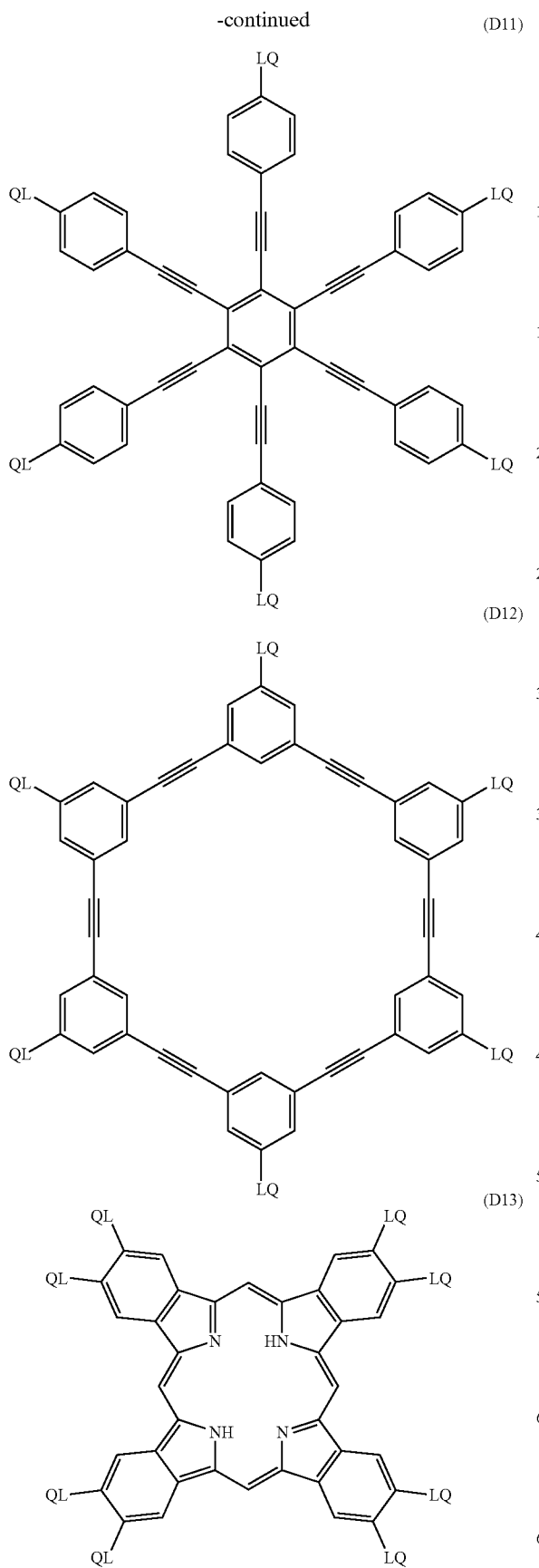

Examples of the additive to be used with the liquid crystalline compound include plasticizers, surfactants, polymers and polymerizable monomers. The variation degree in the alignment directions of long axes may be adjusted by selecting the type of the discotic liquid crystalline compounds or the type of the additives to be used in producing optically anisotropic layers.

Such additive preferably has a compatibility with the liquid crystalline molecules and has a property of changing the tilt angle thereof or of not inhibiting the alignment thereof. Among the additives, polymerizable monomers such as compounds having a vinyl group, vinyloxy group, acryloyl group and methacryloyl group are preferably added to the composition. Such polymerizable compound may be added to the composition with an amount of 1 to 50%, and preferably added with an amount of 5 to 30% with respect to the weight of liquid crystalline compound. Using polymerizable monomer having four or more reactive functional group per a molecule may contribute to improving the adhesion between the alignment layer and the optically anisotropic layer.

Other Additives:

Examples of other additives employable with the liquid crystalline compound include plasticizers, surfactants, polymers and polymerizable monomers. The variation degree in the alignment directions of long axes may of liquid crystalline molecules may be adjusted by selecting the type of the liquid crystalline compounds or the type of the additives to be used therewith.

Such additive preferably has a compatibility with the liquid crystalline molecules and has a property of changing the tilt angle thereof or of not inhibiting the alignment thereof. Among the additives, polymerizable monomers such as compounds having a vinyl group, vinyloxy group, acryloyl group and methacryloyl group are preferably added to the composition. Such polymerizable compound may be added to the composition with an amount of 1 to 50%, and preferably added with an amount of 5 to 30% with respect to the weight of liquid crystalline compound. Using polymerizable monomer having four or more reactive functional group per a molecule may contribute to improving the adhesion between the alignment layer and the optically anisotropic layer.

Adding cellulose ester to the composition is preferred since it is possible to reduce eye holes (hajiki) in a coating process employing the composition. Preferred examples of the cellulose ester include cellulose acetate, cellulose acetate butyrate, cellulose acetate propionate, hydroxy propyl cellulose, methyl cellulose and carboxymethyl cellulose. Among these, preferred is cellulose acetate butyrate; and more preferred is cellulose acetate butyrate of which degree of butyrylation is equal to or more than 40%.

Cellulose ester is preferably added with an amount from 0.1 to 20% with respect to the weight of the liquid crystalline compound, more preferably with an amount 0.05 to 10%, and much more preferably with an amount 0.05 to 5% with respect to the total mass of the liquid crystalline compound.

Organic Solvent:

The liquid crystalline composition of the first invention may be prepared as a coating liquid. The solvent to be used in preparing the coating liquid is preferably an organic solvent. Examples of the organic solvent are amides (e.g., N,N-dimethylformamide), sulfoxides (e.g., dimethyl sulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone), ethers (e.g., tetrahydrofuran, 1,2-dimethoxyethane). Preferred are alkyl halides and ketones. Two or more different types of such organic solvents may be used, as combined.

For producing a high-uniform optically anisotropic film and optical film, the surface tension of the coating liquid is preferably at most 25 mN/m, more preferably at most 22 mN/m.

For more effectively reducing the unevenness in initial drying, the surface tension ratio of the coating liquid of the liquid crystalline composition, measured at 10 msec and at 1000 msec according to a maximum bubble pressure method, (10 msec/1000 msec) is preferably from 1.00 to 1.20, more preferably from 1.00 to 1.15, even more preferably from 1.00 to 1.10. When the surface tension ratio is more than 1.20, then the moving speed to the air interface immediately after coating may be low, and therefore the stability of the coating film surface in air interface may be poor and the effect of reducing the unevenness in initial drying may be insufficient. When the surface tension ratio falls within the range, then the coating liquid is free from the problems and may more effectively reduce the unevenness in initial drying.

The measurement of surface tension according to a maximum bubble pressure method is described in detail in Chemical Handbook, revised edition 5, Chap. 8, Interface and Colloid, p. 90, 8.2 Surface Tension and Wetting, "ASTM D3825-90". Accordingly, the surface tension of the liquid crystalline composition of the invention may be measured with reference to the method described in these publications. For continuously measuring the surface tension with change in time, for example, usable is a surface tensiometer, LAUDA's MPT2.

The first invention also relates to a liquid crystalline composition comprising at least one liquid-crystal compound and at least one fluoroaliphatic group-containing polymer of which viscosity at 25° C. is from 200 Pa·s to 10000 Pa·s. When the viscosity at 25° C. of the fluoroaliphatic group-containing polymer is from 200 Pa·s to 10000 Pa·s, then the composition may form an optically anisotropic film with no unevenness, and the film may be free from a trouble of blocking. The phenomenon blocking means that the films adhere to each other when some excessive pressure is applied thereto before they are dried, or that even after they are dried and cured, they still adhere to each other when they kept in contact with each other because some additive may be localized at the surface areas of the films. In case where a long-shaped film is prepared and when it is rolled up into a roll and stored or transported as its roll, then the film roll is stored for a long period of time while the surface of the film is kept stuck to the back thereof under pressure. As a result of blocking caused under a pressure, the film may lose its transparency and may have some other disadvantage that the surface of the film may adhere to the back thereof. Accordingly, it is desirable that film blocking hardly occurs for better handlability of the produced films and for better producibility thereof in total. In terms of antiblocking, the viscosity of the fluoroaliphatic group-containing polymer is preferably from 250 to 5000 Pa·s, more preferably from 300 to 1000 Pa·s. In the invention, "viscosity" of the fluoroaliphatic group-containing polymer is measured, using a rheometer, Rheologica's VAR-100 Model in an oscillation mode in a nitrogen atmosphere, in which the gap distance is 1.5 mm, the frequency is 1 Hz, the strain is 0.005, and the heating speed is 5° C./min.

In this embodiment, the fluoroaliphatic group-containing polymer is preferably selected from the fluoroaliphatic group-containing polymers of the above formula (1-1). Especially preferred are the fluoroaliphatic group-containing polymers of formula (1-1) where $R^{11}$ and $R^{12}$ are both methyl groups. In the liquid crystalline composition of this embodiment, the content of the fluoroaliphatic group-containing polymer is preferably from 0.02 to 0.50% by mass relative to the total mass of the liquid crystalline composition (in case where the composition is prepared as a coating liquid, this is the solid content of the liquid), as being able to more effectively preventing film flocking. From the same viewpoint, the content is more preferably from 0.03 to 0.30% by mass, even more preferably from 0.05 to 0.20% by mass.

Preferred examples of the optional component, second fluoroaliphatic group-containing polymer, preferred examples of other optional additives, preferred examples of the liquid-crystal compound, and preferred examples of the method for preparation of the liquid crystalline composition may be the same as those mentioned in the above.

[Liquid Crystalline Composition of Second Invention]

The liquid crystalline composition of the second invention comprises at least one liquid-crystal compound and at least one fluoroaliphatic group-containing polymer.

Fluoroaliphatic Group-Containing Polymer:

The fluoroaliphatic group-containing polymer to be used in the second invention has the glass transition point falling within the range from −25° C. to 50° C. Employing the composition comprising such a fluoroaliphatic group-containing polymer as a coating liquid and applying it to any surface, it is possible not only to prevent or reduce unevenness in drying but also to prevent from blocking of films formed of the composition.

From the same viewpoint, preferably, the fluoroaliphatic group-containing polymer has the glass transition point falling within the range from −10° C. to 40° C. and more preferably from 0° C. to 30° C.

It is to be noted that a glass transition point of a polymer may be measured according to any method described in various books and articles. Generally, the properties which are drastically changed at the glass transition point are, for examples, rigidity and viscosity. Regarding rigidity, it may be found as a point of discontinuous change in mechanical characteristics changes depending on temperature according to TMA method; and regarding viscosity, it may be found as a point of discontinuous change in viscoelasticity changes depending on temperature. Generally, a glass transition is an exothermic or endothermic transition, and a glass transition point of a polymer may also be measured according to DSC method, which is a simple method. It may be possible to estimate a glass transition point of a polymer based on grass transition points of similar polymers (e.g. similar polymers having no fluoroaliphatic group), described in handbooks or the like. Such estimation may be carried out by considering the differences in structures (e.g. differences in substitution of hydrogen atoms with fluorine atoms and in substitution degree, and, regarding (met)acrylate polymers, differences in number of carbon atoms in an ester moiety). A glass transition point of a copolymer may be estimated as follows. At first, a glass transition point of a homopolymer of each repetitive unit of a copolymer is measured or estimated, and then a glass transition point of the copolymer is estimated as a sum of products of the measured or estimated glass transition point of each homopolymer and the polymerization ratio (mass ratio) of the repetitive unit, assuming that the contributing ratio of each repetitive unit to the glass transition point is equal to the polymerization ratio of each repetitive unit. According to the invention, the preferred fluoroaliphatic group-containing polymer may be selected, based on such estimated glass transition points, from any known polymers, or may be designed and produced based on such estimated glass transition points.

The fluoroaliphatic group-containing polymer is preferably selected from a formula (1-2) shown below.

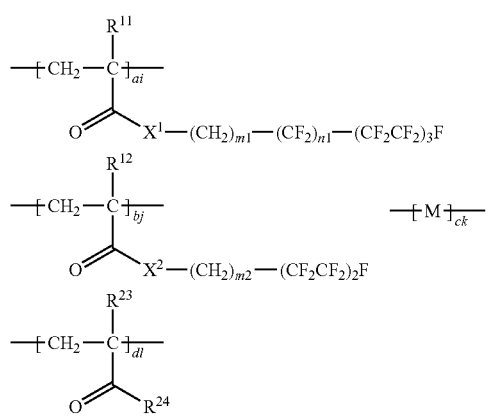

(1-2)

In the formula (1-2), i and j each indicate an integer equal to or more than 1, meaning that the polymer has i and j types of the respective repetitive units; M represents k types of repetitive units each derived from an ethylenic unsaturated monomer (k indicates an integer equal to or more than 1); a, b, c and d each mean a mass percentage indicating a polymerization ratio; Σai means a numerical value of from 1 to 98% by mass; Σbj means a numerical value of from 1 to 98% by mass; Σck means a numerical value of from 1 to 98% by mass, Σdl means a numerical value of from 0.1 to 20% by mass; $R^{11}$, $R^{12}$ and $R^{23}$ each represent a hydrogen atom or a methyl group; $R^{24}$ represents hydroxyl or methoxy; $X^1$ and $X^2$ each represent an oxygen atom, a sulfur atom or —N($R^{13}$)—; $R^{13}$ represents a hydrogen atom or an alkyl group having from 1 to 4 carbon atoms; m1 and m2 each indicate an integer of from 1 to 6; and n1 indicates an integer of from 0 to 3.

In the formula (1-2), the following repetitive units A and B are repetitive units derived from a —(CF$_2$CF$_2$)$_3$F-terminated fluoroaliphatic group-containing monomer A and a —(CF$_2$CF$_2$)$_2$F-terminated fluoroaliphatic group-containing monomer B, respectively.

Repetitive Unit A

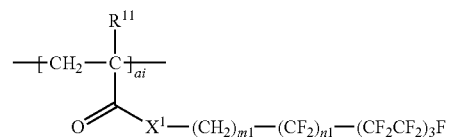

Repetitive Unit B

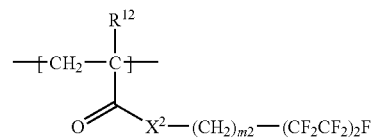

Regarding the repetitive units A and B, their definitions are same as those of the repetitive units A and B employable in the first invention, and the definitions of the symbols in the formulae, preferred scopes thereof, examples of the monomer to give the units, and examples of the method for preparing the monomer are same as those described for the first invention.

The formula (1-2) comprises the following repetitive unit D.

Repetitive Unit D

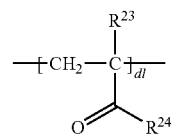

In the unit D, preferably, $R^{23}$ represents methyl, that is, the unit D is preferably a repetitive unit derived from a methacryl base monomer. In the unit, preferably, $R^{24}$ is hydroxyl (OH). That is, the repetitive unit D is more preferably a repetitive unit derived from methacrylic acid.

In the formula (1-2), each M is a repetitive unit derived from an ethylenic unsaturated monomer. M is preferably selected, however not limited to, repetitive units having a polar group capable of hydrogen bonding in the side chain. M is preferably a repetitive unit represented by the formula (2).

Formula (2)

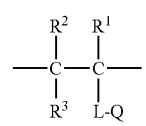

The definition and the preferred scope of the formula (2) are same as those of the formula (2) described above for the first invention.

The fluoroaliphatic group-containing polymer represented by the formula (1-2) comprises at least one repetitive unit A, at least one repetitive unit B, at least one repetitive unit M and at least one repetitive unit D. Specifically, in the formula (1-2), i, j, k and l each indicating the number of the respective repetitive units are individually integers equal to or more than 1. The fluoroaliphatic group-containing polymer of the formula (1-2) may comprise two or more different types of the respective repetitive units, and may comprise any other repetitive units than the repetitive units A, B, M and D. Examples of the monomer which can give the other repetitive unit include, however not to be limited to, (1) alkenes, (2) dienes, (3) α,β-unsaturated carboxylic acid derivatives including (3a) alkyl acrylates, (3b) alkyl methacrylates, (3c) diesters of unsaturated polycarboxylic acids and (3d) amides of α, β-unsaturated carboxylic acids; (4) unsaturated nitriles, (5) styrene or derivatives thereof, (6) vinyl esters, (7) vinyl ethers and (8) other monomers. Examples of each monomer group are same as those exemplified as examples of the monomer groups (1) to (8) employable in the first invention.

In formula (1-2), a, b, c and d mean a mass percentage indicating a polymerization ratio of the monomers that give each of the repetitive units; $\Sigma ai$ means a numerical value of from 1 to 98% by mass; $\Sigma bj$ means a numerical value of from 1 to 98% by mass; $\Sigma ck$ means a numerical value of from 1 to 98% by mass; and $\Sigma dl$ means a numerical value of from 0.1 to 20% by mass. Preferably, $\Sigma ai$ is from 5 to 40% by mass, $\Sigma bj$ is from 5 to 40% by mass, $\Sigma ck$ is from 20 to 90% by mass, and $\Sigma dl$ is from 0.5 to 15% by mass; and more preferably $\Sigma ai$ is from 10 to 35% by mass, $\Sigma bj$ is from 10 to 35% by mass, $\Sigma ck$ is from 30 to 80% by mass, and $\Sigma dl$ is from 1 to 10% by mass. The fluoroaliphatic group-containing polymer of formula (1-2) may contain any other repetitive units than the above repetitive units A, B, M and D; or that is, $\Sigma ai+\Sigma bj+\Sigma ck+\Sigma dl=100\%$ by mass. Preferably, however, the polymer does not contain any other repetitive units than the above repetitive units A, B, M and D; or that is, it is desirable that $\Sigma ai+\Sigma bj+\Sigma ck+\Sigma dl=100\%$ by mass.

The proportion of the repetitive units A and B derived from fluoroaliphatic group-containing monomers, which are in the fluoroaliphatic group-containing polymer, is preferably within a predetermined range, as effective for reducing the occurrence of unevenness in the initial stage of drying. Concretely, the sum of the total mass $\Sigma ai$ of a number i repetitive units A, the total mass $\Sigma bj$ of a number j repetitive units B, ($\Sigma ai+\Sigma bj$) is preferably from 20 to 50% by mass, more preferably from 25 to 45% by mass, even more preferably from 25 to 40% by mass. When ($\Sigma ai+\Sigma bj$) is less than 20% by mass, then the control of liquid-crystal compound in air interface may be insufficient, and the effect of the invention for reducing the unevenness of the optical film may be poor; but when it is more than 50% by mass, then the coatability of the liquid crystalline composition applied to a surface (for example, a surface of a transparent support such as a polymer film) may be insufficient, therefore causing eye holes (hajiki). In case where ($\Sigma ai+\Sigma bj$) falls within the above range, the composition is free from the problems and may reduce more effectively the unevenness in initial drying.

From the same viewpoint, the ratio of $\Sigma ai$ to ($\Sigma ai+\Sigma bj$), ($\Sigma ai/(\Sigma ai+\Sigma bj)$) is preferably from 0.2 to 0.8, more preferably from 0.3 to 0.6, still more preferably from 0.35 to 0.55. When the ratio ($\Sigma ai/(\Sigma ai+\Sigma bj)$) is less than 0.2, then the control of the liquid-crystal compound in air interface may be insufficient, and the effect of the invention for reducing the unevenness of the optical film may be poor; but when it is more than 0.8, then the coatability of the liquid crystalline composition applied to a surface (for example, a surface of a transparent support such as a polymer film) may be insufficient, therefore causing eye holes. In case where ($\Sigma ai/(\Sigma ai+\Sigma bj)$) falls within the above range, the composition is free from the problems and may reduce more effectively the unevenness in initial drying, and therefore it is favorable.

Specific examples of the fluoroaliphatic group-containing polymer usable in the second invention are shown below with their glass transition points, however, examples of the polymer should not be limited. In the following Table, the repetitive units A, B, M and D are specifically indicated by the number of the monomer compounds that give the respective units.

| Polymer No. | Repetitive unit A ($\Sigma ai$: mass %) | Repetitive unit B ($\Sigma bj$: mass %) | Repetitive unit M ($\Sigma ck$: mass %) | Repetitive unit D ($\Sigma dl$: mass %) | Glass transition Point (° C.) |
|---|---|---|---|---|---|
| P2-1 | A2-2 (20) | B2-2 (20) | C-27 (55) | Methacrylic acid (5) | −22° C. |
| P2-2 | A2-2 (20) | B2-2 (20) | C-27 (50) | Methacrylic acid (10) | −2° C. |
| P2-3 | A2-2 (20) | B2-2 (20) | C-27 (45) | Methacrylic acid (15) | 13° C. |
| P2-4 | A2-2 (20) | B2-2 (20) | C-27 (40) | Methacrylic acid (20) | 27° C. |
| P2-5 | A2-2 (25) | B2-2 (25) | C-27 (49) | Methacrylic acid (1) | −20° C. |
| P2-6 | A2-2 (25) | B2-2 (25) | C-27 (45) | Methacrylic acid (5) | −9° C. |
| P2-7 | A2-2 (25) | B2-2 (25) | C-27 (35) | Methacrylic acid (15) | 20° C. |
| P2-8 | A2-2 | B2-2 | C-27 | Methacrylic | 2° C. |

-continued

| Polymer No. | Repetitive unit A (Σai: mass %) | Repetitive unit B (Σbj: mass %) | Repetitive unit M (Σck: mass %) | Repetitive unit D (Σdl: mass %) | Glass transition Point (° C.) |
|---|---|---|---|---|---|
| | (25) | (25) | (35) | acid (15) | |
| P2-9 | A1-2 (25) | B1-2 (25) | C-27 (35) | Methacrylic acid (15) | −3° C. |

The liquid crystalline composition of the second invention may contain at least one of the above-mentioned fluoroaliphatic group-containing polymers, but may contain two or more different types of the polymers. In the composition, the amount of the fluoroaliphatic group-containing polymer is preferably from 0.01 to 20% by mass of the liquid-crystal compound (preferably discotic liquid-crystal compound) therein, more preferably from 0.05 to 10% by mass, even more preferably from 0.1 to 5% by mass. In terms of preventing from blocking, in the composition of the second invention, the amount of the fluoroaliphatic group-containing polymer is preferably from 0.02 to 0.50% by mass, more preferably from 0.03 to 0.30% by mass and further more preferably from 0.05 to 0.20% by mass with respect to the total mass of the composition.

The preferred range of the concentration, C % by mass, of the fluoroaliphatic group-containing polymer in the composition (in case where the composition is prepared as a coating liquid, this is in the solid content of the liquid composition) varies, depending on the fluorine content, F % of the fluoroaliphatic group-containing polymer. For more effectively reducing the unevenness in initial drying, the product of the fluoroaliphatic group-containing polymer concentration, C % by mass and the fluorine content, F % of the fluoroaliphatic group-containing polymer is preferably from 0.05 to 0.12, more preferably from 0.06 to 0.09, even more preferably from 0.06 to 0.08. When C×F is less than 0.05, then the control of the liquid-crystal compound in air interface may be insufficient, and the outward appearance characteristic (degree of uniformity) may be bad; but when it is more than 0.12, then the coatability of the liquid crystalline composition applied to a surface (for example, a surface of a transparent support such as a polymer film) may be insufficient, therefore worsening the outward appearance characteristic of the optical film (causing eye holes (hajiki)). When C×F falls within the above range, then the composition is free from the problems and may reduce more effectively the unevenness in initial drying.

Second Fluoroaliphatic Group-Containing Polymer:

The liquid crystalline composition of the second invention may contain at least one other fluoroaliphatic group-containing polymer (this may be hereinafter referred to as "second fluoroaliphatic group-containing polymer") falling outside the scope of the above-mentioned fluoroaliphatic group-containing polymer (this may be hereinafter referred to as "first fluoroaliphatic group-containing polymer"). Regarding the second fluoroaliphatic group-containing polymer, examples thereof are same as those exemplified as examples of the second fluoroaliphatic group-containing polymer employable in the first invention; and its preferred examples and range of the amount are same as those described for the first invention.

Preferably, the weight-average molecular weight of the first fluoroaliphatic group-containing polymer (and the optional component, second fluoroaliphatic group-containing polymer) is at most 1,000,000, more preferably at most 500,000, even more preferably at most 100,000.

The weight-average molecular weight is determined through gel permeation chromatography (GPC).

Examples of the method for producing the first fluoroaliphatic group-containing polymer (and the optional component, second fluoroaliphatic group-containing polymer) are same as those exemplified for the first invention.

Liquid Crystalline Composition:

The liquid-crystal compound for use in the liquid crystalline composition of the second invention is described below.

Examples of the liquid-crystal compound usable in the second invention include rod-like liquid-crystal compounds and discotic liquid-crystal compounds. Examples of the rod-like and discotic liquid-crystal compounds employable in the second invention are same as those employable in the first invention. The preferred range of the amount of each ingredient in the composition, as well as the preferred method for preparing the composition, is also same as that for the first invention.

According to the embodiment relating to the coating liquid, the preferred range of surface tension of the coating liquid is same as that described for the first invention.

[Optically Anisotropic Film and Optical Film]

The invention also relates to an optically anisotropic film formed of the above-mentioned liquid crystalline composition of the first or second invention, and to an optical film having an optically anisotropic layer formed of the liquid crystalline composition. The optically anisotropic film is preferably produced as follows: The above-mentioned liquid crystalline composition is prepared as a coating liquid, then the coating liquid is applied onto a surface (e.g., a surface of a polymer film to be a support, or a surface of an alignment layer), the molecules of the liquid-crystal compound therein are aligned in a desired state, and thereafter the alignment state is fixed. Coating may be carried out according to any known method such as a wire bar-coating, extrusion-coating, direct gravure-coating, reversed gravure-coating and die-coating.

After being applied to the surface, the coating liquid is dried to remove solvent therefrom, and molecules of liquid crystal compound are aligned in a desired alignment at a temperature controlled if necessary. Any alignments state such as homogeneous, homeotropic, hybrid and oblique alignment states are employable. In a hybrid alignment of discotic liquid crystalline molecules, an angle formed between the long axis (disk face) of a molecule and a layer plane, or, in other words, tilt angle, increases or decreases in the thickness direction (or, in other words, the normal direction) of the optically anisotropic layer, along with an increase in the distance from the surface of the substrate (or the alignment layer). The tilt angle preferably increases along with the increase in the distance from the surface of the substrate (or the alignment layer). Also the change in the tilt angle may be a continuous increase, a continuous decrease, an intermittent increase, an intermittent decrease, a change including a continuous increase and a continuous decrease, or an intermittent change including an increase and a decrease. The intermittent change contains a region in which the tilt angle does not change, within the thickness direction. Also the angular change may be a general increase or a general decrease over the thickness, even including a region without angular change. Also, a continuous angular change is preferable.

The mean direction of the long axes (disk faces) of discotic molecules may be generally adjusted by selecting the types of the discotic liquid crystalline compounds and the materials to be used in producing alignment layers, or by selecting the condition of the rubbing treatments to be applied to alignment layers. The directions of the long axes (disk faces) of discotic molecules existing in the surface side (air-interface side) of the layer may be adjusted by selecting the types of the discotic liquid crystalline compounds or the fluoroaliphatic group-containing polymer, or the types of the above mentioned additives to be used with the liquid crystalline compound.

After being aligned in an alignment state, the liquid crystalline molecules may be fixed in the alignment state. Fixing is preferably carried out by the polymerization reaction of the polymerizable groups in the liquid-crystalline molecules. Examples of the polymerization reaction include thermal polymerization reaction using a thermal polymerization initiator and photo-polymerization reaction using a photo-polymerization initiator. Photo-polymerization reaction is preferred. The coating liquid may comprise a polymerizable monomer and a polymerization initiator which contribute to fixing the alignment state. Examples of the polymerizable monomer include compounds having at least one vinyl, vinyloxy, acryloyl or methacryloyl group. The amount of the polymerizable compound may be from 1 to 50 mass %, and preferably from 5 to 30 mass % with respect to the mass of the liquid crystalline compound. Employing a polymerizable monomer having three or more reactive group may achieve improvement in adhesion between an alignment layer and an optically anisotropic layer.

Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in JPA shyo No. 60-105667 and U.S. Pat. No. 4,239,850) and oxadiazole compounds (described in U.S. Pat. No. 4,212,970).

The amount of the photo-polymerization initiator to be used is preferably 0.01 to 20%, more preferably 0.5 to 5% with respect to the mass of solids in the coating liquid.

Irradiation for polymerizing the liquid-crystalline molecules preferably uses UV rays. The irradiation energy is preferably 20 mJ/cm$^2$ to 50 J/cm$^2$, more preferably 20 to 5000 mJ/cm$^2$ and much more preferably 100 to 800 mJ/cm$^2$. Irradiation may be carried out under heating to accelerate the photo-polymerization reaction.

The thickness of the optically anisotropic layer or film produced according to the above mentioned method is preferably from 0.1 to 20 µm, more preferably from 0.5 to 15 µm, and further more preferably from 1 to 10 µm.

The optically anisotropic film and the optically anisotropic layer are formed on a surface by coating, and therefore it has an interface to the surface and an air interface on the opposite side. The fluorine atom existing in the fluoroaliphatic group-containing polymer may contribute toward unevenness reduction, and therefore it is desirable that the fluorine atoms are localized in the air interface. On the other hand, however, it is also important for unevenness reduction that some fluorine atoms exist in a range of from 0 nm to 10 nm in the depth direction relative to the air interface at a position of 0 nm. From these viewpoints, the fluorine atom existence ratio (ESCA:F/C) in a position from the air interface up to 10 nm is preferably from 2 to 10, relative to the fluorine atom existence ratio (ESCA:F/C) in the air interface of 100.

For producing the optically anisotropic film and the optically anisotropic layer, preferably used is an alignment layer. The alignment layer has a function of determining the alignment direction of liquid-crystal molecules. As the alignment layer, preferred is one prepared by rubbing the surface of a modified polyvinyl alcohol film.

Preferably, the optical film of the invention has a substrate to support the optically anisotropic layer (hereinafter this may be referred to as "support"). The substrate is preferably glass or transparent polymer film. Preferably, the substrate has a light transmittance (400 to 700 nm) of at least 80%, and a haze of at most 2.0%. More preferably, it has a light transmittance of at least 86%, and a haze of at most 1.0%. Examples of the polymer that constitutes the polymer film include cellulose esters (e.g., cellulose mono-, di- or triacylate), norbornene polymers and polymethyl methacrylate. Commercially-available polymers (Arton and Zeonex (both trade names) as norbornene polymers) may also be used. In addition, even conventional polycarbonates, polysulfones and other polymers that may readily express birefringence may also be used in the optical film of the invention, so far as their birefringence expression is controlled through modification of their molecules as in WO00/26705.

[Polarizer]

The invention also relates to a polarizer comprising the above optical film and a polarizing element. When combined with a linear polarizing film as the polarizing element therein, the polarizer may have an application of an elliptic polarizer.

Laminating the optical film of the invention with a polarizing film gives an elliptic polarizer. The polarizing film includes an iodine-based polarizing film, a dichroic dye-containing polarizing film and a polyene-type polarizing film. The iodine-based polarizing film and the dye-containing polarizing film may be produced generally by the use of polyvinyl alcohol films. The polarization axis of the polarizing film corresponds to the direction perpendicular to the stretching direction of the film.

Preferably, the above optical film is laminated on one surface of a polarizing film, and a protective film is on the other surface thereof. The protective film is preferably a transparent protective film having a light transmittance of at least 80%. The transparent protective film is generally a cellulose ester film, preferably a triacetyl cellulose film. The cellulose ester film is preferably formed in a solvent casting method. The thickness of the protective film is preferably from 20 to 500 µm, more preferably from 50 to 200 µm.

[Liquid-Crystal Display Device]

In the invention, the optical film may be used as an optical compensatory sheet in a liquid-crystal display device, and/or the polarizer of the invention may be used as an elliptic polarizer in the device employing any mode such as TN (Twisted Nematic), IPS (In-Plane Switching), FDC (Ferroelectric liquid Crystal), OCB (Optically Compensatory

EXAMPLES

The invention is described more concretely with reference to the following Examples, in which the material and the reagent used, their amount and the ratio, the details of the treatment and the treatment process may be suitably modified or changed not overstepping the sprit and the scope of the invention. Accordingly, the invention should not be limited by the Examples mentioned below.

Example 1-1

A cellulose triacetate film (TAC film) was dipped in a 2.0 N potassium hydroxide solution (25° C.) for 2 minutes, then neutralized with sulfuric acid, washed with pure water, and dried. Onto the TAC film, applied was an alignment layer-coating liquid having the formulation mentioned below, using a wire bar coater #16, in a coating amount of 28 ml/m². This was dried with hot air at 60° C. for 60 seconds, and then further dried with hot air at 90° C. for 150 seconds.

(Formulation of Alignment Layer-Coating Liquid)

| | |
|---|---|
| Modified polyvinyl alcohol mentioned below | 10 mas. pts. |
| Water | 371 mas. pts. |
| Methanol | 119 mas. pts. |
| Glutaraldehyde (crosslinking agent) | 0.5 mas. pts. |

Modified Polyvinyl Alcohol:

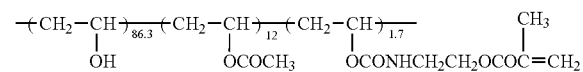

The alignment layer was rubbed in the direction parallel to the slow axis of the TAC film.

(Formation of Optically Anisotropic Layer)

A coating liquid 1-1 having the formulation mentioned below was prepared.

| | |
|---|---|
| Discotic liquid-crystal compound mentioned below | 27.46 mas. % |
| Ethylene oxide-modified trimethylolpropane triacrylate (V#360, by Osaka Organic Chemistry) | 2.72 mas. % |
| Cellulose acetate butyrate (CAB551-0.2, by Eastman Chemicals) | 0.23 mas. % |
| Cellulose acetate butyrate (CAB531-1, by Eastman Chemicals) | 0.07 mas. % |
| Polymer P1-1 (Mw = 15000; first fluoroaliphatic group-containing polymer of formula (1-1)) | 0.07 mas. % |
| Polymer P-0 mentioned below (Mw = 13000, second fluoroaliphatic group-containing polymer) | 0.07 mas. % |
| Photopolymerization initiator (Irgacure 907, by Ciba-Geigy) | 0.90 mas. % |
| Sensitizer (Kayacure DETX, by Nippon Kayaku) | 0.30 mas. % |

-continued

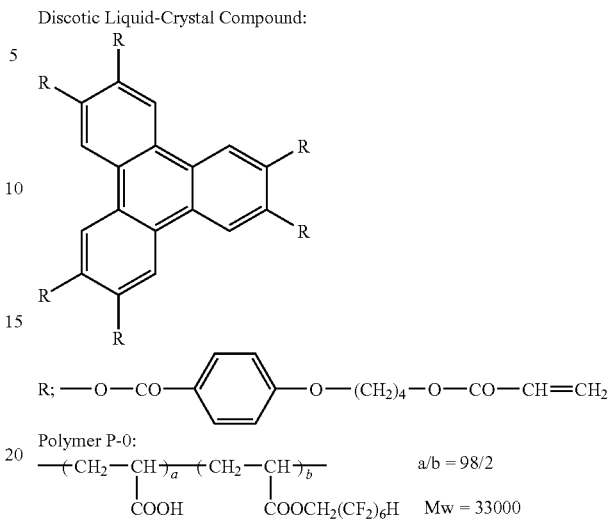

The above ingredients were mixed and dissolved in methyl ethyl ketone (68.31% by mass) to prepare a coating liquid 1-1. With a wire bar #3.6, this was continuously applied onto the alignment layer and then heated at 130° C. for 2 minutes, thereby aligning molecules of the discotic liquid-crystal compound. Next, using a high-pressure mercury lamp (120 W/cm) at 100° C., this was irradiated with UV for 1 minute, thereby polymerizing the discotic liquid-crystal compound. Next, this was left cooled to room temperature. In that manner, an optical film 1-1 was produced.

Coating liquids 1-2 to 1-5 were prepared in the same manner as that for the coating liquid 1-1, for which, however, the fluoroaliphatic group-containing polymer P1-1 was changed to other various polymers and their amount to be added was also changed as in Table 1-1 below. Using these and in the same manner as that for the optical film 1-1, produced were optical films 1-2 to 1-5.

(Outward Appearance Evaluation)

Thus produced, the optical films 1-1 to 1-5 were checked for the presence or absence of unevenness according to the method mentioned below, and their outward appearance was evaluated according to the standards mentioned below.

(Production of Polarizer)

Using a polyvinyl alcohol adhesive, the polymer substrate (TAC film) surface of the produced optical film was stuck to one surface of a polarizing element. On the other hand, a triacetyl cellulose film (TD-80U, by FUJIFILM) having a thickness of 80 μm was saponified, and using a polyvinyl alcohol adhesive, this was stuck to the other surface of the polarizing element. These were so disposed that the transmission axis of the polarizing element could be parallel to the slow axis of the polymer substrate, and that the transmission axis of the polarizing element could be perpendicular to the slow axis of the triacetyl cellulose film. In that manner, polarizers were produced.

(Evaluation for Uniformity on High-Brightness Plane Light Source)

The above polarizer was stuck to a high-brightness plane light source (Gunma Ushio Electric's FP901 High-Brightness Plane Light Source), and visually checked for the uniformity, as compared with a level standard criterion.

○: Unevenness is not visible.

Δ: Unevenness is visible slightly.

x: Unevenness is visible clearly.

TABLE 1-1

| Optical Film | First Fluoroaliphatic group-containing Polymer (mass %) | Second Fluoroaliphatic group-containing Polymer (mass %) | Evaluation of Uniformity |
|---|---|---|---|
| 1-1 (Invention) | P1-1 (0.07) | P-0 (0.07) | ○ |
| 1-2 (Invention) | P1-2 (0.07) | P-0 (0.04) | ○ |
| 1-3 (Invention) | P1-18 (0.07) | P-0 (0.03) | ○ |
| 1-4 (Comparative Example) | Pc-1 (0.09) | — | X |
| 1-5 (Comparative Example) | Pc-2 (0.14) | P-0 (0.01) | X |

Polymer Pc-1 (Mw = 15000):

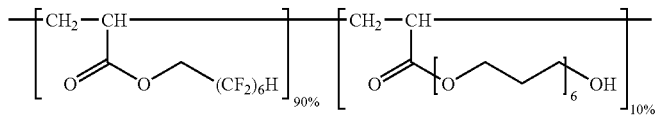

Polymer Pc-2 (Mw = 15000):

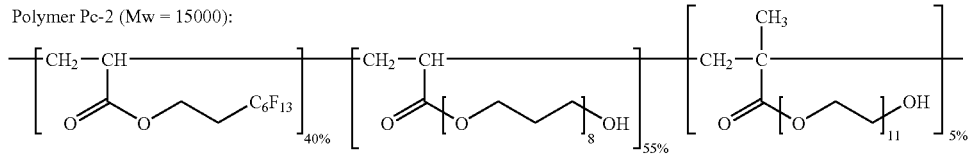

From the results shown in Table 1-1 above, it is understandable that the optical films 1-1 to 1-3, in which a fluoroaliphatic group-containing polymer of formula (1-1) was used for forming the optically anisotropic layer, had no unevenness at all.

(Evaluation for Blocking Resistance of Optical Film)

The optical films 1-1 to 1-3 produced in the above were checked for the blocking resistance, according to the method mentioned below. The viscosity at 25° C. of P1-1 and P1-2 was about 30 Pa·s; but on the other hand, the viscosity at 25° C. of P1-18 was 309 Pa·s.

(Production of Film Sample)

The produced optical film was cut into 5 cm×5 cm pieces, and two pieces were put one upon another. A rubber plate having an area of 4 cm×1 cm was put on it, and a 10-kg weight was further put on it and left as such for 3 hours. The weight and the rubber plate were removed, thereby preparing a sample for blocking resistance evaluation.

(Evaluation for Anti-Blocking)

The coated surface of the thus-prepared film sample for anti-blocking evaluation was observed with a high-brightness light source, and the sample was visually checked for the unevenness as compared with a level standard criterion.

As a result, the surfaces of the optical films 1-1 and 1-2 blocked and had adhesion traces thereon; but the optical film 1-3 had no blocking phenomenon at all.

Example 1-2

Combined in a different blend ratio, Monomer A1-2, Monomer B1-2 and Monomer C-27 shown above were polymerized to give various fluoroaliphatic group-containing methacryl type polymers of the following formula (polymers of formula (1-1)) PM1-1 to PM1-10 having different values of a, b and c (% by mass that indicates the polymerization ratio of the components).

Combined in a different blend ratio, Monomer A1-2, Monomer B1-2 and Monomer C-26 shown above were polymerized to give various fluoroaliphatic group-containing acryl type polymers of the following formula (polymers of formula (1-1)) PA1-1 to PA1-1 having different values of a, b and c.

Fluoroaliphatic Group-Containing Methacryl Type Polymer:

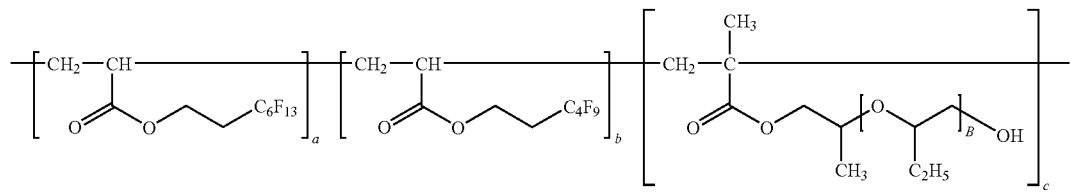

Fluoroaliphatic Group-Containing Acryl Type Polymer:

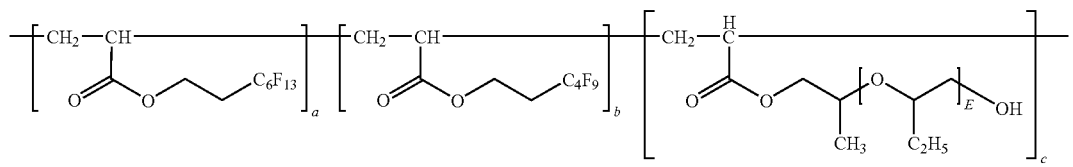

In the same manner as above but using the thus-produced polymers in place of the polymer P1-1, optical films 1-10 to 1-20 were produced. Also in the same manner as above, these were evaluated for their outward appearance (presence of absence of unevenness). In more detail, these were evaluated according to the standards mentioned below.

(Production of Polarizer)

Using a polyvinyl alcohol adhesive, the polymer substrate (TAC film) surface of the produced optical film was stuck to one surface of a polarizing element. On the other hand, a triacetyl cellulose film (TD-80U, by FUJIFILM) having a thickness of 80 μm was saponified, and using a polyvinyl alcohol adhesive, this was stuck to the other surface of the polarizing element. These were so disposed that the transmission axis of the polarizing element could be parallel to the slow axis of the polymer substrate, and that the transmission axis of the polarizing element could be perpendicular to the slow axis of the triacetyl cellulose film. In that manner, polarizers were produced.

(Evaluation in Tn Liquid-Crystal Cell)

A pair of polarizers in a liquid-crystal display device (V260B1, by Chimei Electronic) having an TN-mode liquid-crystal cell were removed; and in place of them, the polarizers produced in Example 1 were set in the device, one on the viewers' side and one on the backlight side, in such a manner that the optical film could face the liquid-crystal cell via an adhesive. These were so disposed that the transmission axis of the polarizer on the viewers' side and the transmission axis of the polarizer on the backlight side could be in an O-mode.

(Evaluation for Uniformity on Liquid-Crystal Display Panel)

The display panel of the liquid-crystal display device was conditioned to exhibit an intermediate tone, and as compared with a level standard criterion, this was visually evaluated for the presence or absence of display unevenness.

Table 1-2 below shows a/(a+b) of the polymer used, (a+b) thereof, and the test results for display uniformity. The numerical value in the Table is a score of uniformity evaluation as compared with the standard criterion; and the samples having a smaller value means that they have less unevenness.

TABLE 1-2

|  |  | a/(a + b) | (a + b) | Evaluation of Uniformity | |
| --- | --- | --- | --- | --- | --- |
| PM1-1 | Methacryl type | 0.85 | 40.0 | 3 | Δ |
| PM1-2 | Methacryl type | 0.6 | 37.0 | 2 | ○ |
| PM1-3 | Methacryl type | 0.6 | 42.0 | 2 | ○ |
| PM1-4 | Methacryl type | 0.6 | 48.0 | 2 | ○ |
| PM1-5 | Methacryl type | 0.5 | 36.0 | 1 | ○ |
| PM1-6 | Methacryl type | 0.5 | 47.0 | 1 | ○ |
| PM1-7 (P1-1) | Methacryl type | 0.5 | 40.0 | 1 | ○ |
| PM1-8 | Methacryl type | 0.4 | 35.0 | 2 | ○ |
| PM1-9 | Methacryl type | 0.4 | 40.0 | 2 | ○ |

TABLE 1-2-continued

|  |  | a/(a + b) | (a + b) | Evaluation of Uniformity | |
| --- | --- | --- | --- | --- | --- |
| PM1-10 | Methacryl type | 0.4 | 46.0 | 2 | ○ |
| PM1-11 (P1-2) | Methacryl type | 0.25 | 40.0 | 2 | ○ |
| PM1-12 | Methacryl type | 0.15 | 33.0 | 3 | Δ |
| PA-1 | Acryl type | 0.85 | 45.0 | 3 | Δ |
| PA-2 | Acryl type | 0.75 | 28.0 | 2 | ○ |
| PA-3 | Acryl type | 0.75 | 33.0 | 2 | ○ |
| PA-4 | Acryl type | 0.75 | 43.0 | 2 | ○ |
| PA-5 | Acryl type | 0.5 | 27.0 | 1 | ○ |
| PA-6 | Acryl type | 0.5 | 35.0 | 1 | ○ |
| PA-7 | Acryl type | 0.5 | 41.0 | 1 | ○ |
| PA-8 | Acryl type | 0.38 | 34.0 | 1 | ○ |
| PA-9 | Acryl type | 0.32 | 34.0 | 1 | ○ |
| PA-10 | Acryl type | 0.25 | 26.0 | 2 | ○ |
| PA-11 | Acryl type | 0.25 | 25.0 | 2 | ○ |
| PA-12 | Acryl type | 025 | 39.0 | 2 | ○ |
| PA-13 | Acryl type | 0.20 | 33.0 | 2 | ○ |
| PA-14 | Acryl type | 0.15 | 35.0 | 3 | Δ |

From the results in the above Table 1-2, it is understandable that, when a fluoroaliphatic group-containing polymer of formula (1-1) where a/(a+b) is from 0.2 to 0.8 and/or (a+b)/(a+b+c) is from 20 to 50% by mass is used, then an optical film having little unevenness and having excellent outward appearance characteristics can be produced.

Example 1-3

The coating liquids 1-1 to 1-4 used in producing the optical films 1-1 to 1-4 in the above Example 1-1 were tested according to a maximum bubble pressure method, in which the surface tension of the liquids was continuously measured for a predetermined period of time. For the measurement, used was a surface tensiometer, LAUDA's MPT2.

Coating liquids 1-1a and 1-1b were prepared in the same manner as that for the coating liquid 1-1, for which, however, the concentration of the constitutive components was varied; and coating liquids 1-2a and 1-2b were prepared in the same manner as that for the coating liquid 1-2, for which, however, the concentration of the constitutive components was varied; and their surface tension was also continuously measured in the same manner as above. Using these coating liquid and in the same manner as in Example 1-1, optical films 1-1a and 1-1b and optical films 1-2a and 1-2b were produced.

The optical films 1-1 and 1-2 produced in Example 1-1, and the optical films 1-1a, 1-1b, 1-2a and 1-2b produced herein were tested for their outward appearance (presence or absence of unevenness) in the same manner as above. In more detail, the samples were evaluated according to the standards mentioned below.

The data of the surface tension of the coating liquids, and the results of the appearance evaluation test of the optical films are shown in Table 1-3.

TABLE 1-3

| Coating Liquid | Polymer* | Surface Tension Time after Coating | | | Ratio of Surface Tension** | Optical Film | Appearance Properties | |
|---|---|---|---|---|---|---|---|---|
| | | 10 msec | 100 msec | 1000 msec | | | | |
| 1-1 (Invention) | P1-1 | 25.0 | 22.5 | 21.9 | 1.1 | 1 | 1 | ○ |
| 1-1a (Invention) | P1-1 | 29.0 | 25.2 | 23.2 | 1.25 | 1a | 3 | Δ |
| 1-1b (Invention) | P1-1 | 29.1 | 25.5 | 22.8 | 1.28 | 1a | 3 | Δ |
| 1-2 (Invention) | P1-2 | 23.9 | 21.7 | 21.1 | 1.1 | 2 | 1 | ○ |
| 1-2a (Invention) | P1-2 | 28.9 | 25.4 | 23.5 | 1.23 | 2a | 3 | Δ |
| 1-2b (Invention) | P1-2 | 28.3 | 24.9 | 22.6 | 1.25 | 2b | 3 | Δ |
| 1-3 (Comparative Example) | Pc-1 | 28.2 | 22.5 | 20.8 | 1.4 | 3 | 5 | x |
| 1-4 (Comparative Example) | Pc-2 | 25.6 | 23.0 | 22.6 | 1.1 | 4 | 4 | x |

*Fluoroaliphatic group-containing polymer
**Ratio of surface tension at 10 msec to that at 1000 msec From the results shown in Table 1-3 above, it may be understandable that the coating liquid that contains a fluoroaliphatic group-containing polymer of formula (1-1) has a low surface tension in initial drying, and as a result, the coating unevenness may be reduced. In particular, it is understandable that, when a coating liquid having a surface tension ratio (10 msec/1000 msec) of from 1.0 to 1.20 is used, then the unevenness may be more effectively reduced, and optical films having more excellent outward appearance can be obtained.

Example 1-4

Various coating liquids were prepared in the same manner as in the coating liquid 1 used in producing the optical film 1-1 in Example 1-1, for which, however, the concentration of the polymer P1-1 (fluoroaliphatic group-containing polymer of formula (1-1)) was changed; and using these coating liquids, various optical films were produced. These optical films were evaluated for the outward appearance in the same manner as above.

Regarding the solid concentration C of the polymer P1-1 in the coating liquids used in producing the optical films and the fluorine content F of the polymer P1-1 (F=0.08% in Polymer P1-1), the product C×F was plotted on the horizontal axis of the graph of FIG. 1; and the score of the outward appearance evaluation test of the optical films was on the vertical axis thereof. In FIG. 1, at most the score 3 is the appearance acceptable level.

From the results shown in the graph of FIG. 1, it is understandable that the value C×F of the polymer P1-1 in the coating liquid has an influence on the outward appearance characteristics of the optical films, and that, when C×F is within a range of from 0.05 to 0.12, optical films having reduced unevenness and having excellent outward appearance can be obtained.

Example 1-5

The optical films 1-1, 1-3 and 1-4 produced in Example 1-1 were analyzed for the fluorine atom distribution in the optically anisotropic layer therein through measurement of ESCA. The results are shown in Table 1-4 below. The ratio of the fluorine atom in Table 1-4 is in terms of a relative value of the fluorine atom concentration in a position of 5 nm and 10 nm in the depth direction, based on the fluorine atom concentration, 100, in the air interface (0 nm) of the optically anisotropic layer of the optical film 1-1. Also in the optical films 1-3 and 1-4, the fluorine atom concentration at each depth is shown as a relative value thereof, based on the concentration, 100, in the air interface (0 nm) of the optically anisotropic layer in the optical film 1-1.

TABLE 1-4

| Optical Film | Fluoroaliphatic group-containing Polymer | fluorine atom concentration Interval from Air Interface of Optically Anisotropic Layer | | | Appearance Properties |
|---|---|---|---|---|---|
| | | 0 (nm) | 5 (nm) | 10 (nm) | |
| 1-1 (Invention) | P1-1 | 100 | 5 | 2 | ○ |
| 1-3 (Comparative Example) | Pc-1 | 100 | 0 | 0 | x |
| 1-4 (Comparative Example) | Pc-2 | 78 | 42 | 23 | x |

From the results in Table 1-4 above, it is understandable that, in the optical film 1-1 of the invention, the fluorine atom is localized in the air interface thereof and is distributed in some degree in the depth direction (on a level of from 2 to 10 or so in a position of 10 nm from the air interface, relative to the standard, 100, in the air interface). It may be considered that the use of the fluoroaliphatic group-containing polymer of formula (1-1) enables the fluorine atom distribution, therefore improving the outward appearance of the optical films.

Example 2-1

A cellulose triacetate film (TAC film) was dipped in a 2.0 N potassium hydroxide solution (25° C.) for 2 minutes, then neutralized with sulfuric acid, washed with pure water, and dried. Onto the TAC film, applied was an alignment layer-coating liquid having the formulation mentioned below, using a wire bar coater #16, in a coating amount of 28 ml/m². This was dried with hot air at 60° C. for 60 seconds, and then further dried with hot air at 90° C. for 150 seconds.

(Formulation of Alignment Layer-Coating Liquid)

| | |
|---|---|
| Modified polyvinyl alcohol mentioned below | 10 mas. pts. |
| Water | 371 mas. pts. |
| Methanol | 119 mas. pts. |
| Glutaraldehyde (crosslinking agent) | 0.5 mas. pts. |

Modified Polyvinyl Alcohol:

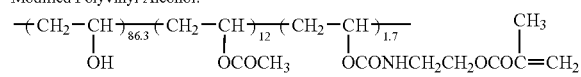

The alignment layer was rubbed in the direction parallel to the slow axis of the TAC film.

(Formation of Optically Anisotropic Layer)

A coating liquid 2-1 having the formulation mentioned below was prepared.

| | |
|---|---|
| Discotic liquid-crystal compound mentioned below | 27.46 mas. % |
| Ethylene oxide-modified trimethylolpropane triacrylate (V#360, by Osaka Organic Chemistry) | 2.72 mas. % |
| Cellulose acetate butyrate (CAB551-0.2, by Eastman Chemicals) | 0.23 mas. % |
| Cellulose acetate butyrate (CAB531-1, by Eastman Chemicals) | 0.07 mas. % |
| Polymer P2-1 (Mw = 14000; first fluoroaliphatic group-containing polymer of formula (1-2)) | 0.07 mas. % |
| Polymer P-0 mentioned below (Mw = 13000, second fluoroaliphatic group-containing polymer) | 0.03 mas. % |
| Photopolymerization initiator (Irgacure 907, by Ciba-Geigy) | 0.90 mas. % |
| Sensitizer (Kayacure DETX, by Nippon Kayaku) | 0.30 mas. % |

Discotic Liquid-Crystal Compound:

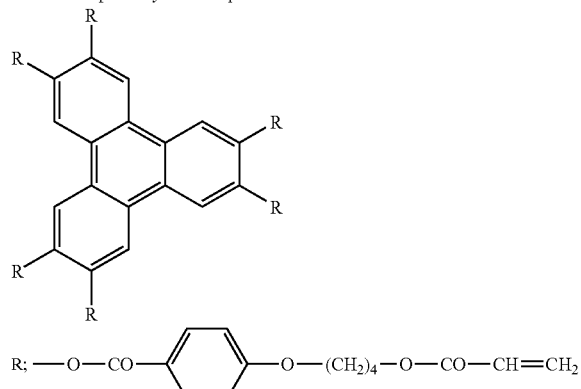

Polymer P-0:

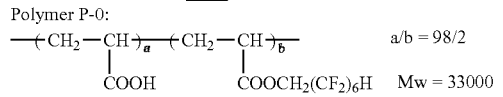

The above ingredients were mixed and dissolved in methyl ethyl ketone (68.31% by mass) to prepare a coating liquid 2-1. With a wire bar #3.6, this was continuously applied onto the alignment layer and then heated at 130° C. for 2 minutes, thereby aligning molecules of the discotic liquid-crystal compound. Next, using a high-pressure mercury lamp (120 W/cm) at 100° C., this was irradiated with UV for 1 minute, thereby polymerizing the discotic liquid-crystal compound. Next, this was left cooled to room temperature. In that manner, an optical film 2-1 was produced.

Coating liquids 2-2 to 2-14 were prepared in the same manner as that for the coating liquid 2-1, for which, however, the fluoroaliphatic group-containing polymer P2-1 was changed to other various polymers and their amount to be added was also changed as in Table 2-1 below. Using these and in the same manner as that for the optical film 2-1, produced were optical films 2-2 to 2-14.

<Outward Appearance Evaluation>

Thus produced, the optical films 2-1 to 2-14 were checked for the presence or absence of unevenness according to the method mentioned below, and their outward appearance was evaluated according to the standards mentioned below.

(Production of Polarizer)

Using a polyvinyl alcohol adhesive, the polymer substrate (TAC film) surface of the produced optical film was stuck to one surface of a polarizing element. On the other hand, a triacetyl cellulose film (TD-80U, by FUJIFILM) having a thickness of 80 μm was saponified, and using a polyvinyl alcohol adhesive, this was stuck to the other surface of the polarizing element. These were so disposed that the transmission axis of the polarizing element could be parallel to the slow axis of the polymer substrate, and that the transmission axis of the polarizing element could be perpendicular to the slow axis of the triacetyl cellulose film. In that manner, polarizers were produced.

(Evaluation for Uniformity on High-Brightness Plane Light Source)

The above polarizer was stuck to a high-brightness plane light source (Gunma Ushio Electric's FP901 High-Brightness Plane Light Source), and visually checked for the uniformity, as compared with a level standard criterion.

○: Unevenness is not visible.

Δ: Unevenness is visible slightly.

x: Unevenness is visible significantly.

<Evaluation for Blocking Resistance of Optical Film>

The optical films 2-1 to 2-14 produced in the above were checked for the blocking resistance (anti-blocking property), according to the method mentioned below.

(Production of Film Sample)

The produced optical film was cut into 5 cm×5 cm pieces, and two pieces were put one upon another. A rubber plate having an area of 4 cm×1 cm was put on it, and a 10-kg weight was further put on it and left as such for 3 hours. The weight and the rubber plate were removed, thereby preparing a sample for blocking resistance evaluation.

(Evaluation for Blocking Resistance)

The coated surface of the thus-prepared film sample for blocking resistance evaluation was observed with a high-brightness light source, and the sample was visually checked for the unevenness as compared with a level standard criterion.

◎: No blocking phenomenon is observed, and unevenness is not visible at all.

○: Blocking phenomenon is observed slightly, but unevenness is not visible.

Δ: Blocking phenomenon is observed, and unevenness is visible.

x: Blocking phenomenon is observed slightly, and unevenness is visible significantly.

TABLE 2-1

| Optical Film | Polymer* (mass %) | Glass Transition point (° C.) | Evaluation of Unevenness | Evaluation of Blocking |
|---|---|---|---|---|
| 2-1 | P2-1 (0.07) | −22 | ○ | ○ |
| 2-2 | P2-2 (0.07) | −2 | ○ | ○ |
| 2-3 | P2-3 (0.07) | 13 | ○ | ⊚ |
| 2-4 | P2-4 (0.07) | 27 | ○ | ⊚ |
| 2-5 | P2-5 (0.07) | −20 | ○ | ○ |
| 2-6 | P2-6 (0.07) | −9 | ○ | ○ |
| 2-7 | P2-7 (0.07) | 20 | ○ | ⊚ |
| 2-8 | P2-8 (0.07) | 2 | ○ | ○ |
| 2-9 | P2-9 (0.07) | −3 | ○ | ○ |
| 2-10 | P2-6 (0.20) | −9 | ○ | ○ |
| 2-11 | P2-6 (0.80) | −9 | ○ | Δ |
| 2-12 | P2-6 (0.01) | −9 | Δ | ○ |
| 2-13 | Pc-1 (0.07) | −60 | ○ | X |
| 2-14 | Pc-2 (0.07) | −53 | X | X |

*Fluoroaliphatic group-containing polymer
Pc-1 (MW = 13000)

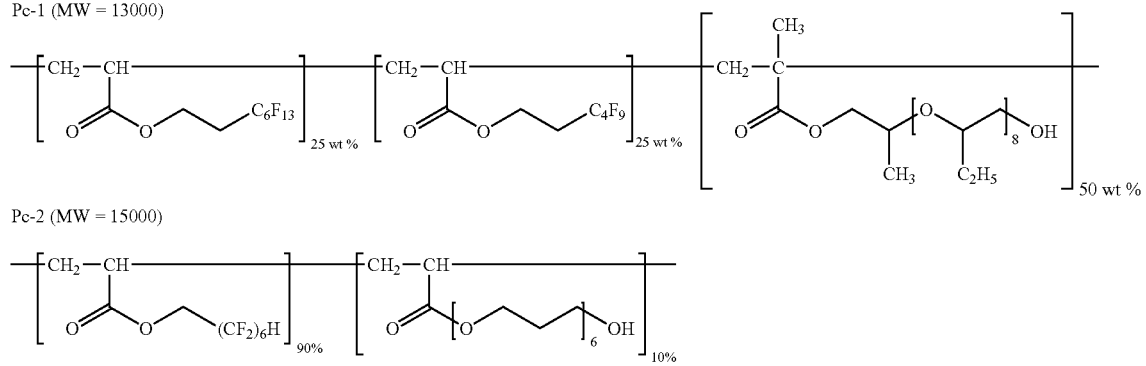

Pc-2 (MW = 15000)

From the results shown in Table 2-1 above, it is understandable that the optical films 2-1 to 2-12, comprising a fluoroaliphatic group-containing polymer having a glass transition point falling within the predetermined range, are excellent in terms

Example 2-2

Combined in a different blend ratio, Monomer A2-2, Monomer B2-2, Monomer C-27 and methacrylic acid shown above were polymerized to give various fluoroaliphatic group-containing methacryl type polymers of the following formula (polymers of formula (2-1)) PM2-1 to PM2-10 having different values of a, b and c (% by mass that indicates the polymerization ratio of the components).

Combined in a different blend ratio, Monomer A2-2, Monomer B2-2, Monomer C-26 and methacrylic acid shown above were polymerized to give various fluoroaliphatic group-containing acryl type polymers of the following formula (polymers of formula (2-1)) PA2-1 to PA2-10 having different values of a, b and c.

Fluoroaliphatic Group-Containing Methacryl Type Polymer:

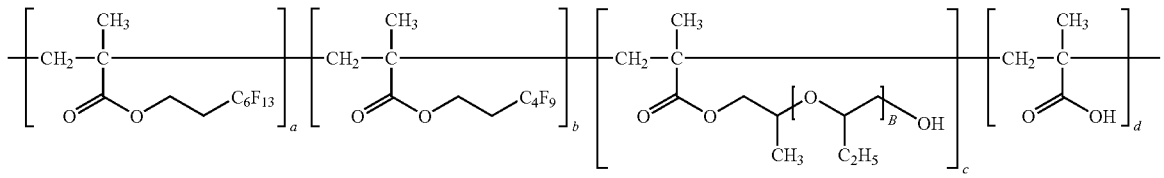

Fluoroaliphatic Group-Containing Acryl Type Polymer:

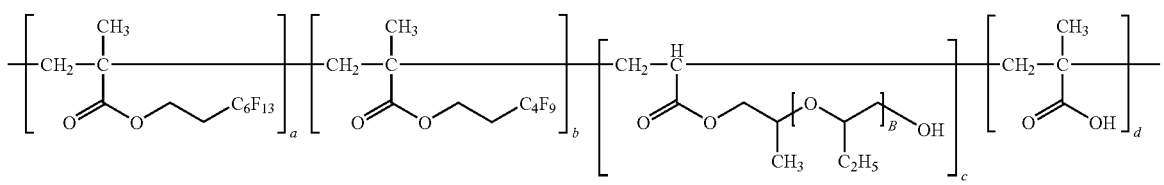

In the same manner as above but using the thus-produced polymers in place of the polymer P2-1, optical films 2-10 to 2-20 were produced. Also in the same manner as above, these were evaluated for their outward appearance (presence of absence of unevenness). In more detail, these were evaluated according to the standards mentioned below.

(Production of Polarizer)

Using a polyvinyl alcohol adhesive, the polymer substrate (TAC film) surface of the produced optical film was stuck to one surface of a polarizing element. On the other hand, a triacetyl cellulose film (TD-80U, by FUJIFILM) having a thickness of 80 μm was saponified, and using a polyvinyl alcohol adhesive, this was stuck to the other surface of the polarizing element. These were so disposed that the transmission axis of the polarizing element could be parallel to the slow axis of the polymer substrate, and that the transmission axis of the polarizing element could be perpendicular to the slow axis of the triacetyl cellulose film. In that manner, polarizers were produced.

(Evaluation in Tn Liquid-Crystal Cell)

A pair of polarizers in a liquid-crystal display device (V260B1, by Chimei Electronic) having an TN-mode liquid-crystal cell were removed; and in place of them, the polarizers produced in Example 1 were set in the device, one on the viewers' side and one on the backlight side, in such a manner that the optical film could face the liquid-crystal cell via an adhesive. These were so disposed that the transmission axis of the polarizer on the viewers' side and the transmission axis of the polarizer on the backlight side could be in an O-mode.

(Evaluation for Uniformity on Liquid-Crystal Display Panel)

The display panel of the liquid-crystal display device was conditioned to exhibit an intermediate tone, and as compared with a level standard criterion, this was visually evaluated for the presence or absence of display unevenness.

Table 2-2 below shows a/(a+b) of the polymer used, (a+b) thereof, and the test results for display uniformity. The numerical value in the Table is a score of uniformity evaluation as compared with the standard criterion; and the samples having a smaller value means that they have less unevenness.

TABLE 2-2

| | | a/(a + b) | (a + b) | Evaluation of Uniformity | |
|---|---|---|---|---|---|
| PM2-1 | Methacryl type | 0.85 | 40.0 | 3 | Δ |
| PM2-2 | Methacryl type | 0.6 | 37.0 | 2 | ○ |
| PM2-3 | Methacryl type | 0.6 | 42.0 | 2 | ○ |
| PM2-4 | Methacryl type | 0.6 | 48.0 | 2 | ○ |
| PM2-5 | Methacryl type | 0.5 | 36.0 | 1 | ○ |
| PM2-6 | Methacryl type | 0.5 | 47.0 | 1 | ○ |
| PM2-7 (P2-1) | Methacryl type | 0.5 | 40.0 | 1 | ○ |
| PM2-8 | Methacryl type | 0.4 | 35.0 | 2 | ○ |
| PM2-9 | Methacryl type | 0.4 | 40.0 | 2 | ○ |
| PM2-10 | Methacryl type | 0.4 | 46.0 | 2 | ○ |
| PM2-11 | Methacryl type | 0.25 | 40.0 | 2 | ○ |
| PM2-12 | Methacryl type | 0.15 | 33.0 | 3 | Δ |
| PA2-1 | Acryl type | 0.85 | 45.0 | 3 | Δ |
| PA2-2 | Acryl type | 0.75 | 28.0 | 2 | ○ |
| PA2-3 | Acryl type | 0.75 | 33.0 | 2 | ○ |
| PA2-4 | Acryl type | 0.75 | 43.0 | 2 | ○ |
| PA2-5 | Acryl type | 0.5 | 27.0 | 1 | ○ |
| PA2-6 | Acryl type | 0.5 | 35.0 | 1 | ○ |
| PA2-7 | Acryl type | 0.5 | 41.0 | 1 | ○ |
| PA2-8 | Acryl type | 0.38 | 34.0 | 1 | ○ |
| PA2-9 | Acryl type | 0.32 | 34.0 | 1 | ○ |
| PA2-10 | Acryl type | 0.25 | 26.0 | 2 | ○ |
| PA2-11 | Acryl type | 0.25 | 25.0 | 2 | ○ |
| PA2-12 | Acryl type | 025 | 39.0 | 2 | ○ |

TABLE 2-2-continued

| | | a/(a + b) | (a + b) | Evaluation of Uniformity | |
|---|---|---|---|---|---|
| PA2-13 | Acryl type | 0.20 | 33.0 | 2 | ○ |
| PA2-14 | Acryl type | 0.15 | 35.0 | 3 | Δ |

From the results in the above Table 2-2, it is understandable that, when a fluoroaliphatic group-containing polymer of formula (2-1) where a/(a+b) is from 0.2 to 0.8 and/or (a+b)/(a+b+c) is from 20 to 50% by mass is used, then an optical film having little unevenness and having excellent outward appearance characteristics can be produced.

What is claimed is:

1. A liquid crystalline composition comprising at least one liquid-crystal compound and at least one fluoroaliphatic group-containing polymer of a formula (1-1):

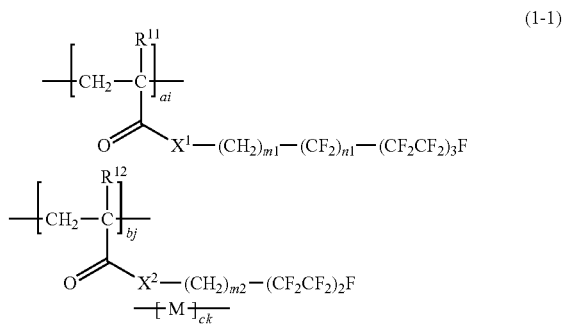

(1-1)

wherein i and j each indicate an integer equal to or more than 1, meaning that the polymer has i and j types of the respective repetitive units; M represents k types of repetitive units each derived from an ethylenic unsaturated monomer, wherein k indicates an integer equal to or more than 1; a, b and c each mean a mass percentage indicating a polymerization ratio; Σai means a numerical value of from 1 to 98% by mass; Σbj means a numerical value of from 1 to 98% by mass; Σck means a numerical value of from 1 to 98% by mass; $R^{11}$ and $R^{12}$ each represent a hydrogen atom or a methyl group; $X^1$ and $X^2$ each represent an oxygen atom, a sulfur atom or —N($R^{13}$)—; $R^{13}$ represents a hydrogen atom or an alkyl group having from 1 to 4 carbon atoms; m1 and m2 each indicate an integer of from 1 to 6; and n1 indicates an integer of from 0 to 3, wherein M represents a unit derived from a branched acryl monomer or a branched methacryl monomer represented by formula C-26 or formula C-27:

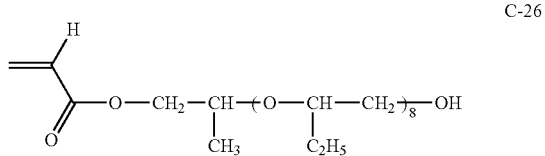

C-26

-continued

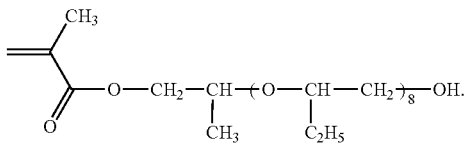
C-27

2. The liquid crystalline composition of claim 1, wherein $\Sigma ai/(\Sigma ai+\Sigma bj)$ is from 0.2 to 0.8.

3. The liquid crystalline composition of claim 1, wherein $\Sigma ai+\Sigma bj$ is from 20 to 50% by mass.

4. The liquid crystalline composition of claim 1, wherein the viscosity at 25° C. of the fluoroaliphatic group-containing polymer is from 200 Pa·s to 10000 Pa·s.

5. The liquid crystalline composition of claim 1, wherein the content of the fluoroaliphatic group-containing polymer is from 0.02 to 0.50% by mass with respect to the total mass of the composition.

6. The liquid crystalline composition of claim 1, wherein the ratio of the surface tension of the composition at 10 msec to that at 1000 msec (10 msec/1000 msec), as measured according to a maximum bubble pressure method, is from 1.00 to 1.20.

7. The liquid crystalline composition of claim 1, wherein the product of the concentration, C % by mass, of the fluoroaliphatic group-containing polymer and the fluorine content, F %, in the fluoroaliphatic group-containing polymer, C×F, is from 0.05 to 0.12.

8. A liquid crystalline composition comprising at least one liquid-crystal compound and at least one fluoroaliphatic group-containing polymer, wherein the glass transition point of the fluoroaliphatic group-containing polymer is from −25° C. to 50° C., wherein the fluoroaliphatic group-containing polymer is represented by a formula (1-2) shown below:

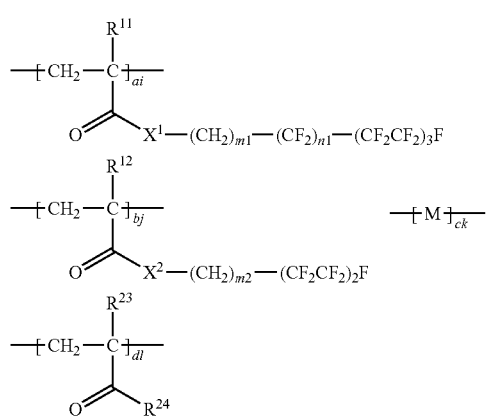
(1-2)

where i and j each indicate an integer equal to or more than 1, meaning that the polymer has i and j types of the respective repetitive units; M represents k types of repetitive units each derived from an ethylenic unsaturated monomer, wherein k indicates an integer equal to or more than 1; a, b, c and d each mean a mass percentage indicating a polymerization ratio; $\Sigma ai$ means a numerical value of from 1 to 98% by mass; $\Sigma bj$ means a numerical value of from 1 to 98% by mass; $\Sigma ck$ means a numerical value of from 1 to 98% by mass, $\Sigma dl$ means a numerical value of from 0.1 to 20% by mass; $R^{11}$, $R^{12}$ and $R^{23}$ each represent a hydrogen atom or a methyl group; $R^{24}$ represents hydroxyl or methoxy; $X^1$ and $X^2$ each represent an oxygen atom, a sulfur atom or —N($R^{13}$)—; $R^{13}$ represents a hydrogen atom or an alkyl group having from 1 to 4 carbon atoms; m1 and m2 each indicate an integer of from 1 to 6; and n1 indicates an integer of from 0 to 3, wherein M represents a unit derived from a branched acryl monomer or a branched methacryl monomer represented by formula C-26 or formula C-27:

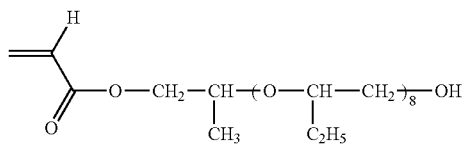
C-26

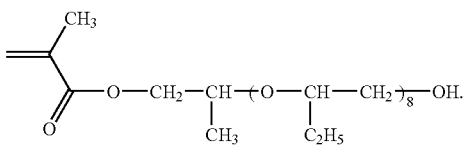
C-27

9. The liquid crystalline composition of claim 8, wherein the content of the fluoroaliphatic group-containing polymer is from 0.02 to 0.50% by mass with respect to the total mass of the composition.

10. The liquid crystalline composition of claim 8, wherein $R^{11}$, $R^{12}$ and $R^{23}$ each represent a methyl group.

11. The liquid crystalline composition of claim 8, wherein $\Sigma ai/(\Sigma ai+\Sigma bj)$ is from 0.2 to 0.8.

12. The liquid crystalline composition of claim 8, wherein $\Sigma ai+\Sigma bj$ is from 20 to 50% by mass.

13. An optically anisotropic film formed of a liquid crystalline composition of claim 1.

14. The optically anisotropic film of claim 13, wherein the fluorine atom existence ratio (ESCA:F/C) in a position from the air interface up to 10 nm is from 2 to 10, relative to the fluorine atom existence ratio (ESCA:F/C) in the air interface of 100.

15. An optical film comprising an optically anisotropic layer formed of a liquid crystalline composition as set forth in claim 1.

16. A polarizer comprising an optical film as set forth in claim 15.

17. A liquid-crystal display device comprising an optical film as set forth in claim 15.

18. An optically anisotropic film formed of a liquid crystalline composition of claim 8.

19. The optically anisotropic film of claim 18, wherein the fluorine atom existence ratio (ESCA:F/C) in a position from the air interface up to 10 nm is from 2 to 10, relative to the fluorine atom existence ratio (ESCA:F/C) in the air interface of 100.

20. An optical film comprising an optically anisotropic layer formed of a liquid crystalline composition as set forth in claim 8.

21. A polarizer comprising an optical film as set forth in claim 20.

22. A liquid-crystal display device comprising an optical film as set forth in claim 20.

* * * * *